United States Patent
Pannell

(10) Patent No.: US 9,219,693 B2
(45) Date of Patent: Dec. 22, 2015

(54) NETWORK DEVICES WITH TIME AWARE MEDIUM ACCESS CONTROLLER

(71) Applicant: Marvell World Trade Ltd., Hamilton (BM)

(72) Inventor: Donald Pannell, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 252 days.

(21) Appl. No.: 13/772,908

(22) Filed: Feb. 21, 2013

(65) Prior Publication Data

US 2013/0215743 A1 Aug. 22, 2013

Related U.S. Application Data

(60) Provisional application No. 61/601,848, filed on Feb. 22, 2012.

(51) Int. Cl.
*H04L 12/28* (2006.01)
*H04L 12/801* (2013.01)
(Continued)

(52) U.S. Cl.
CPC .............. *H04L 47/22* (2013.01); *H04L 12/28* (2013.01); *H04L 47/10* (2013.01); *H04L 47/564* (2013.01)

(58) Field of Classification Search
CPC ....... H04L 47/10; H04L 47/26; H04L 49/506; H04L 1/1887; H04L 43/106; H04L 47/283
See application file for complete search history.

(56) References Cited

U.S. PATENT DOCUMENTS

| 5,774,700 A | 6/1998 | Fisch et al. |
| 6,038,230 A | 3/2000 | Ofek |
| 6,707,791 B1 | 3/2004 | Sundqvist |

(Continued)

FOREIGN PATENT DOCUMENTS

| WO | WO-2012/104623 A2 | 8/2012 |
| WO | WO-2012/122382 A1 | 9/2012 |

(Continued)

OTHER PUBLICATIONS

Min-Jun Kim et al.: "Frame Forwarding Rules for Link Utilization in IEEE 802.1 AVB Networks", Advanced Language Processing and Web Information Technology, 2008. ALPIT '08. International Conference on, IEEE, Piscataway, NJ, USA, Jul. 23, 2008, pp. 509-512.

(Continued)

*Primary Examiner* — Brandon Renner
*Assistant Examiner* — Debebe Asefa

(57) ABSTRACT

A network device includes a memory, a MAC module, a host control module, and a selector module. The memory stores frames and timestamps corresponding to the frames. The MAC module receives the frames and the timestamps and forwards the frames to a physical layer device. The MAC module includes queues that store the frames received from the memory, and shaping modules that receive the frames from the queues and spread data in the frames over time to generate blocking signals. The host control module transfers ownership of the frames to the MAC module. The host control module or the MAC module masks the transfer of the ownership of first frames including gating the first frames based on the timestamps to delay reception of the first frames in the queues. The selector module selects one of the blocking signals, and forwards the selected blocking signal to the physical layer device.

18 Claims, 13 Drawing Sheets

(51) Int. Cl.
H04L 12/875 (2013.01)
H04L 12/815 (2013.01)

(56) References Cited

U.S. PATENT DOCUMENTS

| | | | |
|---|---|---|---|
| 6,707,821 | B1 | 3/2004 | Shaffer et al. |
| 7,120,113 | B1 | 10/2006 | Zhang et al. |
| 7,426,206 | B1 | 9/2008 | Ofek et al. |
| 7,668,103 | B1* | 2/2010 | Pannell et al. ............... 370/237 |
| 7,924,711 | B2 | 4/2011 | Rosen |
| 8,171,152 | B2 | 5/2012 | White et al. |
| 8,238,250 | B2* | 8/2012 | Fung ............................ 370/237 |
| 8,379,644 | B1* | 2/2013 | Pannell ......................... 370/392 |
| 8,838,787 | B2 | 9/2014 | Gelter et al. |
| 8,937,974 | B1* | 1/2015 | Pannell ......................... 370/516 |
| 8,982,896 | B2 | 3/2015 | Pannell |
| 2002/0118692 | A1 | 8/2002 | Oberman et al. |
| 2002/1011869 | | 8/2002 | Oberman et al. |
| 2003/0142696 | A1 | 7/2003 | Holmeide et al. |
| 2004/0114516 | A1 | 6/2004 | Iwata et al. |
| 2004/0202191 | A1 | 10/2004 | Vrabel |
| 2005/0111362 | A1 | 5/2005 | Freytsis et al. |
| 2005/1011136 | | 5/2005 | Freytsis et al. |
| 2006/0239333 | A1 | 10/2006 | Albert et al. |
| 2008/0095053 | A1 | 4/2008 | Chen et al. |
| 2009/0135958 | A1 | 5/2009 | Rueckriem et al. |
| 2012/0163521 | A1 | 6/2012 | Kirrmann et al. |
| 2013/0215743 | A1 | 8/2013 | Pannell |
| 2014/0071823 | A1 | 3/2014 | Pannell |
| 2014/0341032 | A1 | 11/2014 | Thaler |

FOREIGN PATENT DOCUMENTS

| | | | |
|---|---|---|---|
| WO | WO-2013126630 | A1 | 8/2013 |
| WO | WO-2014043092 | A1 | 3/2014 |

OTHER PUBLICATIONS

PCT International Search Report and Written Opinion of the International Searching Authority dated Dec. 12, 2013 corresponding to PCT/US2013/058954, 11 pages.
Yong-Do Choi et al.: "A Forwarding Method on the IEEE 802.1 AVB", Advanced Language Processing and Web Information Technology, 2008. ALPIT '08. International Conference on, IEEE, Piscataway, NJ, USA, Jul. 23, 2008, pp. 497-502.
PCT International Search Report and Written Opinion of the International Searching Authority dated Jun. 26, 2012 corresponding to PCT/US2012/028290; 13 pages.
Yoram Ofek et al: "The Integrated Metanet Architecture: A Switch-Based Multimedia LAN for Parallel Computing and Real-Time Traffic", Proceedings of the Conference on Computer Communications (INFOCOM), Los Alamitos, IEEE Comp. Soc. Press., US, vol. 2, Jun. 12, 1994, pp. 802-811.
U.S. Appl. No. 13/415,112, filed Mar. 8, 2012, Donald Pannell.
U.S. Appl. No. 14/022,562, filed Sep. 10, 2013, Donald Pannell.
U.S. Appl. No. 14/658,747, filed Mar. 16, 2015, Donald Pannell.
U.S. Appl. No. 14/733,296, filed Jun. 8, 2015, Donald Pannell.
U.S. Appl. No. 14/733,370, filed Jun. 8, 2015, Donald Pannell.
Pannell, Don, "AVB—Generation 2 Latency Improvement Options", Mar. 2011; IEEE 802.1; 46 pages.
Finn, Norman, "Preemptive Transmission advantages", Jan. 2012; IEEE 802.1; 12 pages.
PCT International Search Report and Written Opinion of the International Searching Authority dated Jun. 13, 2013 corresponding to PCT/US2013/027223; 7 pages.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE Std 802.11a-1999 (Supplement to IEEE Std 802.11-1999) Supplement to IEEE Standard for Information technology—Telecommunications and information exchange between systems—Local and metropolitan area networks-Specific requirements—Part11: Wireless LAN Medium Access Control (MAC) and Physical Layer (PHY) specifications: High-Speed Physical Layer in the 5 GHZ Band; LAN/MAN Standards Committee of the IEEE Computer Society; Sep. 16, 1999; 91 pages.
IEEE Std. 802.11b; Supplement to IEEE Standard for Information technology-Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.
IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.
Kiran Gunnam et al.; "Multi-Rate Layered Decoder Architecture for Block LDPC Codes of the IEEE 802.11n Wireless Standard"; 2007; pp. 1645-1648.
802.16/2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std 802.20/2008; IEEE Standard for Local and metropolitan area networks; Part 20: Air Interface for Mobile Broadband Wireless Access Systems Supporting Vehicular Mobility-Physical and Media Access Control Layer Specification; IEEE Computer Society; Sponsored by the LAN/MAN Standards Committee; Aug. 29, 2008; 1032 pages.
"Specification of the Bluetooth System" Master Table of Contents & Compliance Requirements—Covered Core Package version: 4.0; Jun. 30, 2010; 2302 pages.
IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee: Jan. 2012; 359 pages.
IEEE P802.11ad / D5.0 (Draft Amendment based on IEEE P802.11REVmb 010.0) (Amendment to IEEE 802.11REVmb D10.0 as amended by IEEE 802.11ae D5.0 and IEEE.802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
IEEE Std 802.11h 2003 (Amended by IEEE Std 802.11a, 1999 Edition (Reaff 2003) amended by IEEE Stds 802.11a 1999, 802.11b 1999, 802.11b 1999/Cor 1-2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifi-

(56) References Cited

OTHER PUBLICATIONS cations, Amendment 5: Spectrum and Transmit Power Management Extensions in the 5 GHz band in Europe; IEEE Computer Society, Sponsored by the LAN/MAN Standards Committee; Oct. 14, 2003; 75 pages.
IEEE Std 802.1Qav—2009 (Amendment to IEEE Std. 802.1Q—2005) IEEE Standard for Local and metropolitan area networks—Virtual Bridged Local Area Networks, Amendment 12: Forwarding and Queuing Enhancements for Time-Sensitive Streams; IEEE Computer Society, Sponsored by the LAN/MAN Standards Committee; Jan. 5, 2010; 87 pages.
Soren Rumpf et al.; "Software Stacks for Mixed-critical Applications: Consolidating IEEE 802.1 AVB and Time-triggered Ethernet in Next-generation Automotive Electronics"; Department of Computer Science Hamburg University of Applied Sciences, Germany; 2014; 5 pages.
802.1AS—Timing and Synchronization; "Standard for Local and Metropolitan Area Networks—Timing and Synchronization for Time-Sensitive Applications in Bridged Local Area Networks"; Editor—Geoff Garner; May 25, 2006; 7 pages.
IEEE 802.1 Qbv Draft 5C's for Time Aware Shaper enhancement to 802.1Q; Version 2, Edited by Don Pannell at Marvell; Jan. 2012; 7 pages.
Finn, Norman. "Preemptive Transmission advantages", Jan. 2012; IEEE 802.1; 12 pages.
IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.
IEEE P802.11g/D8.2 Draft Supplement to Standard [for] Information Technology-Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.
IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology-Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
IEEE Std 802.11h 2003 (Amendment to IEEE Std 802.11, 1999 Edition (Reaff 2003) as amended by IEEE Stds 80211a 1999, 802.11b 1999, 802.11b 1999/Cor 1-2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5 GHz band in Europe; IEEE Computer Society, Sponsored by the LAN/MAN Standards Committee; Oct. 14, 2003; 75 pages.
IEEE Std 802.1Qav-2009 (Amendment to IEEE Std. 802.10-2005) IEEE Standard for Local and metropolitan area networks—Virtual Bridged Local Area Networks, Amendment 12: Forwarding and Queuing Enhancements for Time-Sensitive Streams; IEEE Computer Society, Sponsored by the LAN/MAN Standards Committee; Jan. 5, 2010; 87 pages.
802.1AS—Timing and Synchronization; "Standard for Local and Metropolitan Area Networks-Timing and Synchronization for Time-Sensitive Applications in Bridged Local Area Networks"; Editor—Geoff Garner, May 25, 2006; 7 pages.

\* cited by examiner

NETWORK DEVICES WITH TIME AWARE MEDIUM ACCESS CONTROLLER

CROSS-REFERENCE TO RELATED APPLICATIONS

This claims the benefit of U.S. Provisional Application No. 61/601,848 filed on Feb. 22, 2012. The entire disclosure of the application referenced above is incorporated herein by reference.

FIELD

The present disclosure relates to networks, and more particularly to latencies of data sources and data overflow of receivers in a network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A data communication network may include multiple talkers (or sources of data) and multiple receivers. Any number of bridges (or switches) may be connected between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network.

A non-arbitrary network may be, for example, an automotive network within a vehicle or a manufacturing assembly line network. In general, network devices in a non-arbitrary network are fixed and are not being connected and/or disconnected from the non-arbitrary network. Although network devices may be connected to and/or disconnected from a non-arbitrary network, communication with a network device that is being connected to or disconnected from the non-arbitrary network is given lower priority during transmission periods of high-priority data. During these transmission periods, high-priority data is transmitted between network devices in the non-arbitrary network.

For example, a non-arbitrary Ethernet network that is operating according to Institute of Electrical and Electronics Engineers (IEEE) 802.1 Qav may include a talker (or source), multiple bridges and a listener (or receiver). The talker may transmit high-priority data to the listener over the bridges during allocated transmission periods of periodic transmission time intervals. High-priority data may refer to, for example, Class A or Class B data with low-latency requirements. The term latency refers to time for a high-priority frame to be transmitted through one or more hops of the non-arbitrary network. The latency of a single hop is measured from a time when a last bit of a high-priority frame is received by a network device for that hop to a time when the last bit is transmitted from the network device. Simply stated, the latency of a single hop is measured from the last bit into the network device to the last bit out of the network device. A single hop may refer to a talker (referred to as an end station) or a bridge of the non-arbitrary network.

In a non-arbitrary Ethernet network, transmitted data may have, for example, one of three to eight priority levels. Class A data may include audio video bridging (AVB) data with a highest priority level. The highest priority is used to insure the lowest latency. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. All Non-AVB data use the remaining lower priority levels. In general, higher priority data is transmitted before lower priority data. If a device supports less than the maximum eight priority levels the IEEE 802.1 Qav standard defines how the eight external priorities are to be mapped to the number of priorities supported by the device. In all cases Class A is the highest.

IEEE AVB standards define a set of standards that when used together support guaranteed bandwidth and latency for reserved AVB streams over various networking media, such as networking media satisfying IEEE 802.3 Ethernet standards. The IEEE 802.1Qav standard requires that a bridge reshape (i.e., spread out) an AVB stream passing through the bridge. This is done on a per-class basis in a bridge. Since AVB supports two classes of data, namely Class A and Class B, two Qav shapers are needed per egress port in a bridge.

FIG. 1 shows an example of a traditional bridge 10. Although the bridge 10 is shown having a certain number of ingress ports and egress ports, the bridge 10 may have additional ingress and/or egress ports. The bridge 10 includes ingress ports Pu-Py, an ingress module 12, and an egress module 14. The ingress module 12 receives data from the ports Pu-Py and can store the data in a memory 16. The egress module 14 can include, for example, a Class A queue 18, a Class B queue 20 and non-AVB queues 22 per egress port. The queues 18, 20, 22 receive data from the ingress module 12 and store data of the respective Classes A, B, non-AVB.

The egress module 14 further includes Class shapers (identified as Class shapers $f_Q$), a selector module 24, a multiplexer 26 and an output port 28. The Class shapers $f_Q$ are provided for AVB data including Class A data and Class B data. The Class shapers $f_Q$ shape (or spread out) respectively the Class A data and the Class B data received from a corresponding one of the Class A queue and Class B queue. As a result, the data is shaped on a per-class basis. The Class A data and the Class B data are independently spread out over time at respective rates of the Class shapers $f_Q$. The selector module 24 signals the multiplexer 26 to select data from one of the Class shapers $f_Q$ or the non-AVB queues 22 to provide to the output port 18.

SUMMARY

A network device is provided and includes a memory, a media access control (MAC) module, a host control module, and a selector module. The memory is configured to store (i) frames received from a source, and (ii) timestamps corresponding to the frames. The MAC module is configured to (i) receive the frames and the timestamps from the memory, and (ii) forward the frames to a physical layer device. The MAC module includes queues and shaping modules. The queues are configured to store the frames received from the memory. The shaping modules are configured to (i) receive the frames from the queues, and (ii) spread data in the frames over time to generate blocking signals. The host control module is configured to transfer ownership of the frames from the host control module to the MAC module. The host control module or the MAC module is configured to mask the transfer of the ownership of first frames of the frames including gating the first frames based on the timestamps to delay reception of the first frames in the queues. The selector module is configured to (i) select one of the blocking signals, and (ii) forward the selected blocking signal to the physical layer device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

IEEE 802.1Qav requires that talkers (network source nodes of data streams) perform per-flow shaping (or pacing) followed by per-class shaping. A talker may receive data from one or more sources, such as a microphone, a storage device, a digital versatile disc (DVD) player, etc. The talker can perform shaping for each source to insure that each flow of data received from a source is appropriately spaced out, since the flows of data from the sources can (i) end up being received at different listeners (network receive nodes of data streams), and (ii) follow different paths through a network prior to being received at the listeners.

As an example, a talker can send out two Class A data flows in a network. The first one of the data flows may be at 5 mega-bits per second (Mbit/s) and the second one of the data flows may be at 20 Mbit/s. The talker may shape the data flows independently via flow shapers and at a respective rate of the corresponding one of the flow shapers. A flow shaper may be referred to as a shaping module. The flow shapers may satisfy, for example, the IEEE 802.1Qav standard. Since the two data flows are in the same class and initially enter the network on a same link of an egress port of the talker, the data flows need to be re-shaped at a combined rate. For the provided example, the combined rate is 25 Mbit/s, which is equal to the sum of the flow rates of the data flows. This is the per-class shaping that follows the per-flow shaping required by the IEEE 802.1Qav standard and can be identical to the per-class shaping performed in a bridge.

The shapers satisfying the IEEE 802.1Qav standard, spreads a stream of AVB data out such that there is no (or minimal) bursting or bunching (i.e., back to back AVB frames). A minimal amount of bursting is permitted while an AVB queue (a Class A queue or a Class B queue) is 'catching up'. A queue can be catching up, for example, when a head-of-line frame in the queue has not been permitted to be transmitted when originally scheduled due to congestion. This can occur when a corresponding egress port was busy transmitting a frame from another queue. An example of a talker having per-flow shaping followed by per-class shaping is shown in FIG. 2.

Figure 1:
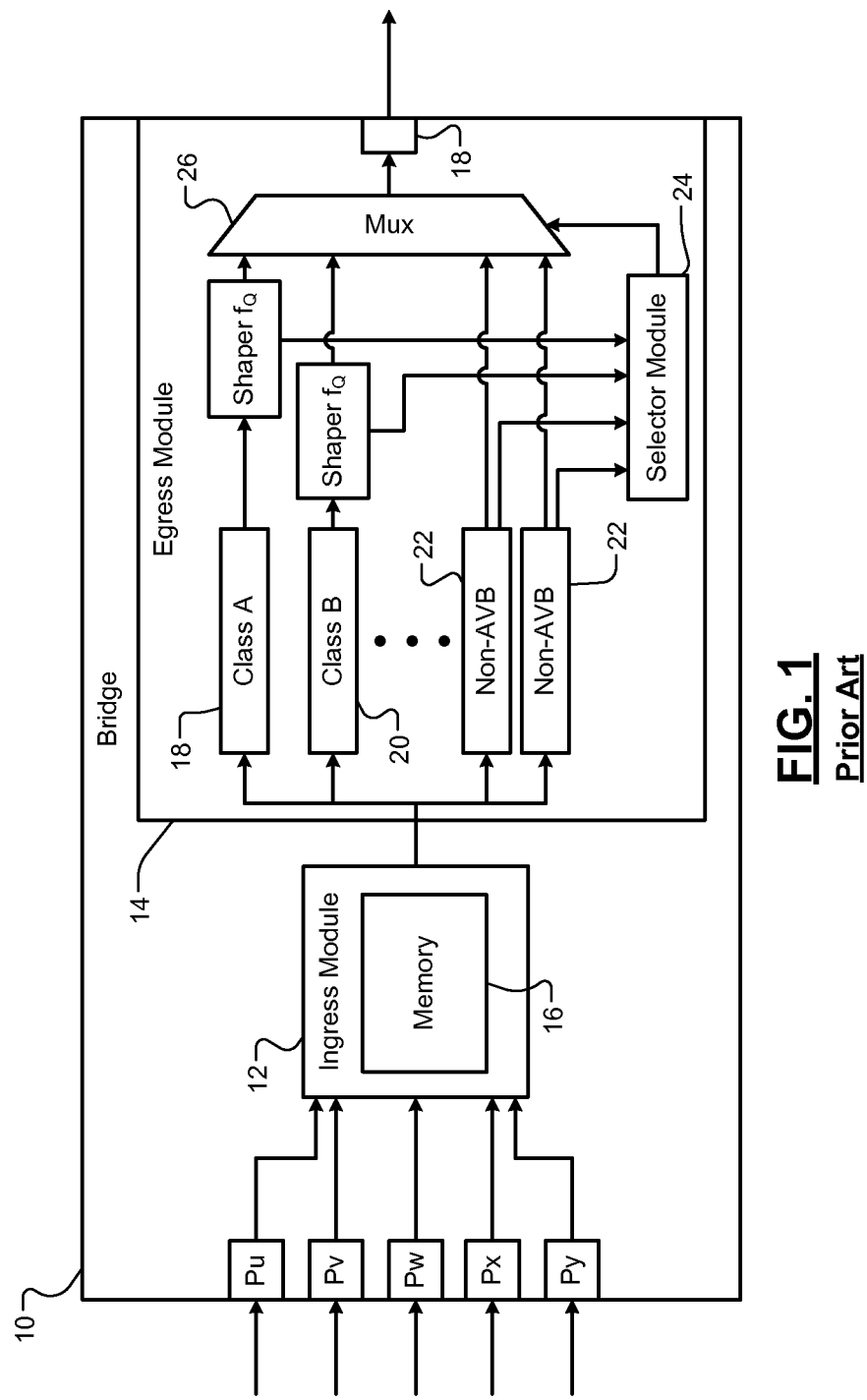
FIG. 1 is a functional block diagram of a prior art bridge.
Figure 2:
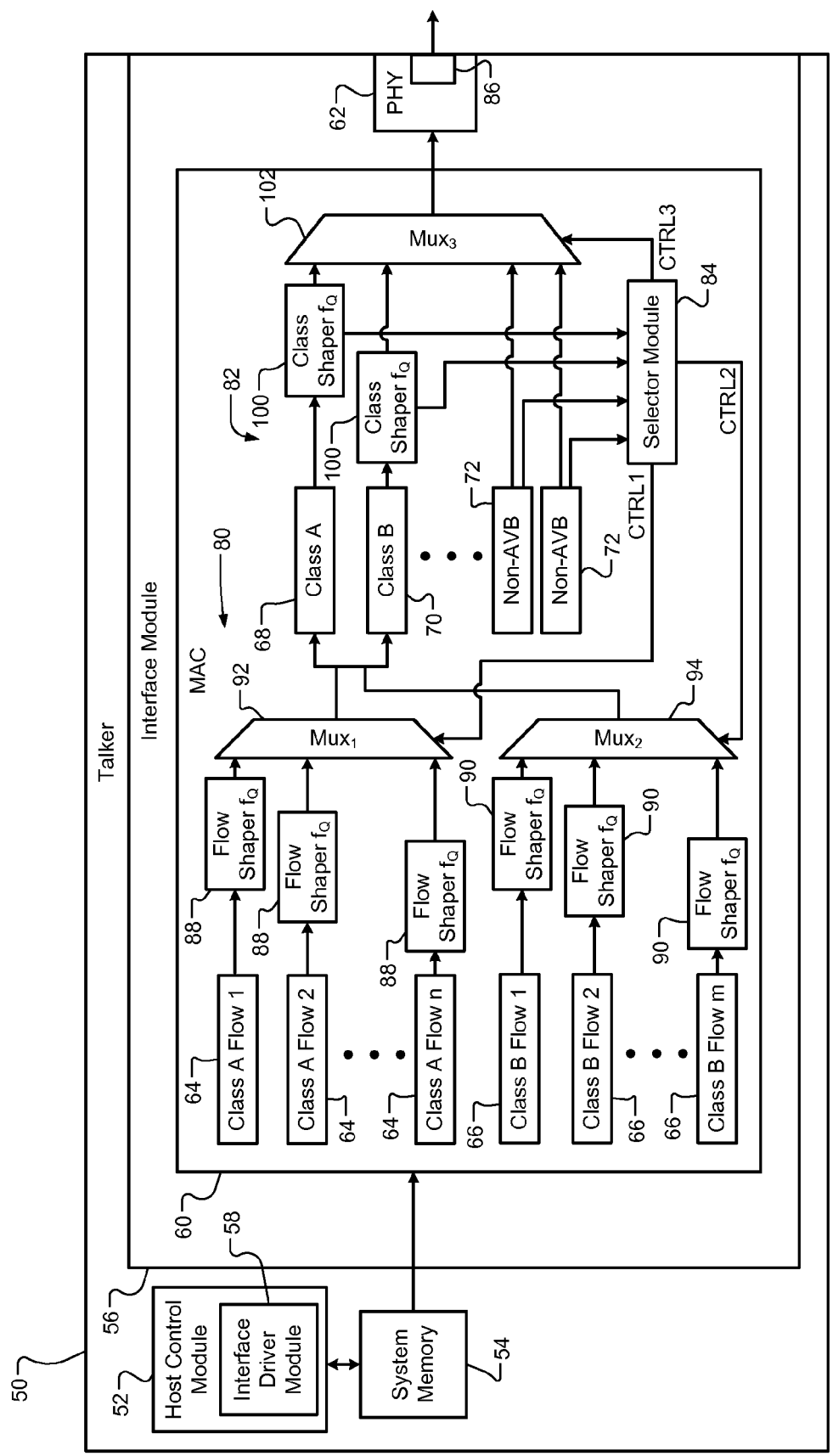
FIG. 2 is a functional block diagram of a talker including flow shapers and class shapers.
Figure 3:
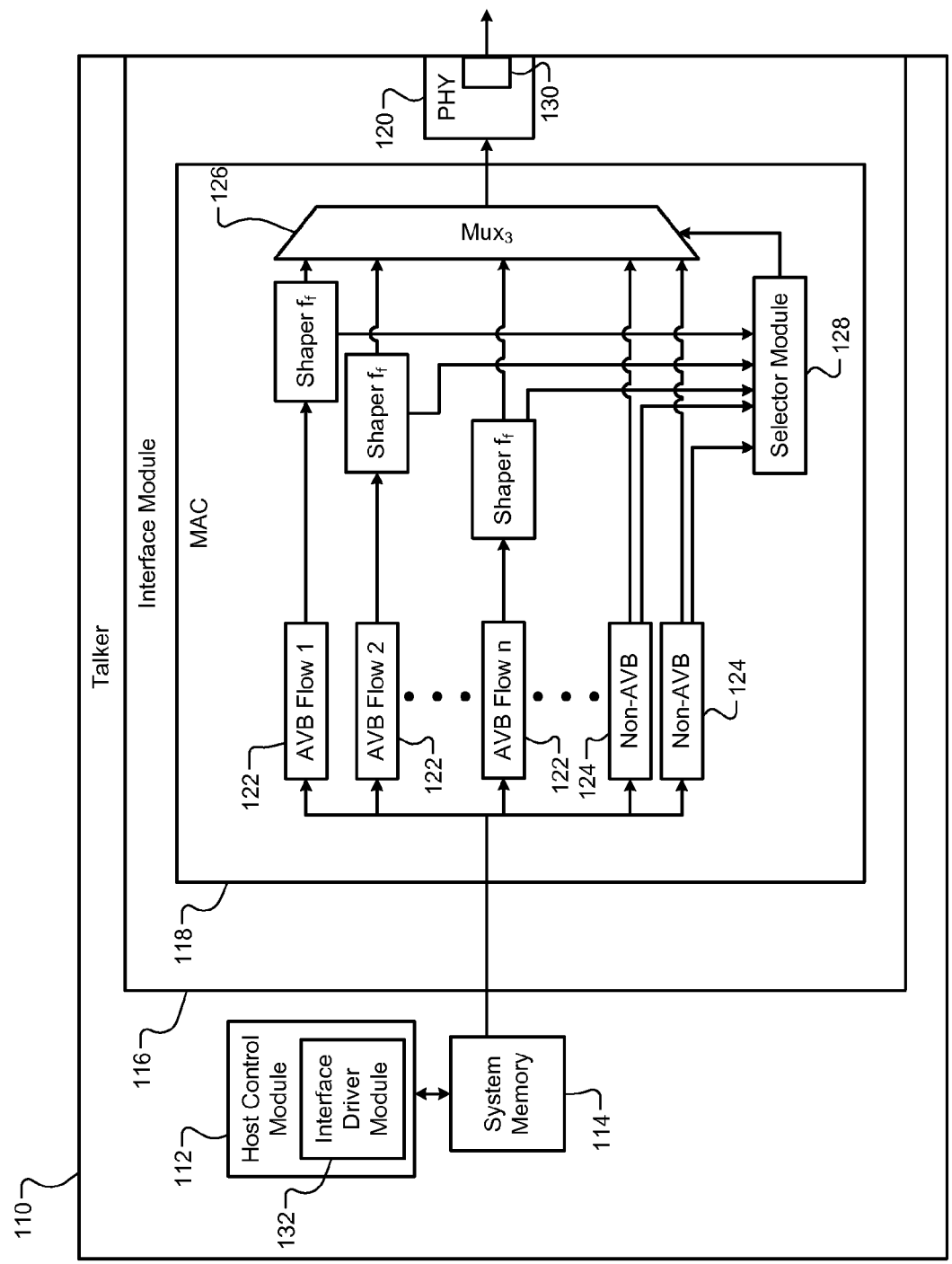
FIG. 3 is a functional block diagram of a talker including combined flow and class shapers.

FIG. 2 shows a talker 50 including flow shapers (identified as flow shapers $f_{Q1}$) and class shapers (identified as class shapers $f_{Q2}$). FIG. 2 is shown to describe how per-flow shaping may be performed prior to per-class shaping. Although a talker may be implemented as shown in FIG. 2, a more efficient implementation is shown in FIG. 3. The talker of FIG. 3 provides the same shaping as the talker 50, but includes a single stage of queues rather than multiple stages of queues. Each additional stage of queues increases data transfer latencies, storage requirements and logic as further described below.

The talker 50 of FIG. 2 includes a host control module 52, system memory 54, and an interface module 56. The host control module 52 may include an interface driver module 58 that executes driver software to transfer data stored in the system memory 54 to the interface module 56. The driver software may be referred to as a network interface card (NIC) driver. The interface module 56 may be, for example, a NIC and includes a media access control module (MAC) 60 and a physical layer (PHY) device 62. The MAC 60 may be referred to as a media access controller and receives the data from the host control module 52 and distributes the data to respective AVB queues 64, 66, 68, 70 and non-AVB queues 72 in the MAC 60 based on the class of the data.

The MAC 60 includes a flow shaping circuit 80, a class shaping circuit 82, a selector module 84, and an output port 86. The flow shaping circuit 80 includes: a first stage of queues including the AVB queues 64, 66; first flow shapers 88, 90; a first multiplexer 92, and a second multiplexer 94. The AVB queues 64, 66 include Class A queues and Class B queues, which receive respective Class A data and Class B data. The first flow shapers 88, 90 may satisfy the IEEE 802.1Qav standard and include a flow shaper for each of the Class A queues and Class B queues and as a result provide per-flow shaping for AVB data.

The first multiplexer 92 selects data from the flow shapers connected to the Class A queues based on a first control signal CTRL1. The second multiplexer 94 selects data from the flow shapers connected to the Class B queues based on a second control signal CTRL2. The first control signal CTRL1 and the second control signal CTRL2 may be generated by the selector module 84. The selector module 84 may be a strict selector and select data based on priority levels of the data and/or corresponding queues.

The class shaping circuit 82 includes: a second stage of queues including the queues 68, 70, 72; second class shapers 100; and a third multiplexer 102. The queue 68 is a Class A queue and receives Class A data from the first multiplexer 92. The queue 70 is a Class B queue and receives Class B data from the second multiplexer 94. The queues 72 are non-AVB queues and receive non-AVB data from the system memory 54.

The second class shapers 100 may satisfy the IEEE 802.1Qav standard and include a class shaper for each of the queues 68, 70. The third multiplexer 102 selects data from the second class shapers 100 and the non-AVB queues 72 based on a third control signal CTRL3 and outputs the selected data to the egress port 86. The third control signal CTRL3 may be generated by the selector module 84.

A talker may not be implemented with the first stage of queues 64, 66, the first flow shapers 88, 90, the multiplexers 92, 94 while yet providing per-flow shaping followed by per-class shaping. Incorporation of the first stage of queues 64, 66, the first flow shapers 88, 90, and the multiplexers 92, 94 increases data management complexity, circuit complexity, and latency of data transfer. There is increased latency associated with transferring data between queues. Incorporation of the first stage of queues 64, 66, the first flow shapers 88, 90, and the multiplexers 92, 94, requires the talker to include control tasks typically performed by a bridge (or switch). These control tasks may be performed, for example, by the host control module 52 via software executed by the host control module 52.

FIG. 3 provides an example implementation without the first stage of queues 64, 66, the first flow shapers 88, 90, and the multiplexers 92, 94 of FIG. 2. FIG. 3 shows a talker 110 including combined flow and class shapers (identified as combined shapers $f_f$). The talker 110 includes a host control module 112, a system memory 114 and an interface module 116. The interface module 116 may be, for example, a NIC and includes a MAC 118 and a PHY device 120. The MAC 118 receives the data from the system memory 114 and distributes the data to respective AVB queues 122 and non-AVB queues 124 in the MAC 118 based on the class of the data.

The MAC 118 includes the queues 122, 124, the combined shapers $f_f$, a multiplexer 126, and a selector module 128. The AVB queues 122 may receive Class A data or Class B data from the system memory 114. For this reason, each of the AVB queues 122 is either a Class A queue or a Class B queue. The non-AVB queues 124 may receive non-AVB data from the system memory 114. The Class A queues have a higher priority level (lower queue number) than the Class B queues. The combined shapers $f_f$ perform both per-flow shaping and per-class shaping. The multiplexer 126 selects data from the combined shapers $f_f$ and the non-AVB queues based on a control signal from the selector module 128 and outputs the data to an egress port 130 of the PHY device 120. The selector module 128 may be a strict selector and may select data from the queues 124, 126 based on priority level of the data and/or corresponding queue. When multiple queues have data that is ready to be transmitted, the queue having the highest priority level may be selected.

The combined shapers $f_f$ are non-time aware shapers, since the IEEE 802.1 Qav shapers $f_f$ do not operate based on a clock signal and/or timestamps of frames and thus are not synchronized with a clock of other network devices. Each of the combined shapers $f_f$ is configured for a rate of data flow into a corresponding queue to provide appropriate shaping for the data flow. Each of the combined shapers $f_f$ determines when the selector module 128 'sees' each frame of data (detects a frame in the blocking shaper). This includes delaying when the selector module 128 'sees' a next frame in a queue until after a first or 'head-of-line' frame in the queue is done being transmitted. The selector module 128 'sees' a frame when a combined shaper provides access to the frame to the selector module 128. This is done via access signals transmitted from the blocking shapers $f_f$ to the selector module 128.

The combined shapers $f_f$ are 'smarter' than the flow and class shapers $f_{Q1}$, $f_{Q2}$ of FIG. 2. Each of the combined shapers $f_f$ receives access and/or determines status information of each of the other combined shapers $f_f$ of the same class in contrast to the flow and class shapers of $f_{Q1}$, $f_{Q2}$. The status information may include, for each of the combined shapers $f_f$ and queues of a certain class, information indicating: the other combined shapers $f_f$ and/or queues of the same class; a current flow rate of the other combined shapers $f_f$ and/or queues assigned to the same class; and a total flow rate for all the combined shapers $f_f$ and/or queues of the same class. Each of the combined shapers $f_f$ may also be able to access and/or determine when a last frame of a corresponding class of data was transmitted by one of the queues of that class. For example, one of the combined shapers $f_f$ may determine when a last frame of Class A data was transmitted by the AVB queues assigned to Class A data. With this information each of the combined shapers $f_f$ releases frames from a corresponding one of the AVB queues to the multiplexer 126. This is done such that the frames are passed to the multiplexer as though being previously passed through a per-flow shaper followed by a per-class shaper, as required by the IEEE 802.1Qav standard. A per-flow shaper may be referred to as a flow shaping module. A per-class shaper may be referred to as a class shaping module.

Although the implementation of FIG. 3 includes combined shapers $f_f$, which are more complicated than flow and class shapers $f_{Q1}$, $f_{Q2}$, the implementation of FIG. 3 eliminates a need for a sophisticated queue manager or switch control module to manage data flow through multiple stages of queues. Also, added latency of transferring data between flow and class queues is avoided. The implementation of FIG. 3 allows combined shapers to be implemented in hardware, which allows the host control module 112 to burst data to the AVB queues 122 without need for the host control module 112 to execute additional software or application code to manage data flow through the MAC 118. Software that is executed by the host control module 112 may not have information regarding the combined shapers and/or queues in the MAC 118. The software may not be aware that a given flow is even using an AVB steam path through the network. This allows older software to get the bandwidth and latency delivery guarantees offered by AVB without a change in the software.

The host control module 112 may include an interface driver module 132 that has information indicating to which of the queues 122, 124 frames are to be transferred. The interface driver module 132 may determine which of the queues 122, 124 that the frames are to be transferred to by determining a destination address associated with the frames and/or by inspecting, for example, descriptors of the frames. The descriptors may include the destination address. Descriptor generation and other information that may be included in a descriptor are further described below.

The combined shapers $f_f$ as stated are not time aware and as a result use of the combined shapers $f_f$ has associated disadvantages. Accuracy of the combined shaper's rate $f_f$ is tied to the accuracy of the local clock, which may be based on accuracy of a local crystal. IEEE 802.3 standards require that the accuracy of the local crystal be +/−100 parts-per-million (ppm). As a result, the accuracy of the combined shapers $f_f$ may be +/−100 ppm. If the local clock is fast (+ppm), then the combined shapers $f_f$ release data faster than a programmed rate. If the local clock is slow (−ppm), then the combined g shapers $f_f$ release data slower than the programmed rate. Releasing data at a rate slower than the programmed rate can cause the data to be held up. This can result in buffers or queues in a talker to potentially overflow and/or data to arrive late at a listener. The listener may underflow buffers in the listener due to the increased latency of the data.

Difference between a rate at which data is actually transmitted or played out (referred to as the media clock rate) and a target media clock rate can be based on accuracy of the local crystal being used. If the accuracy of the local crystal is +/−100 ppm, the rate at which data is received at a queue (referred to as the actual data rate) can be off by as much as +/−200 ppm relative to the programmed rate of the combined shapers $f_f$.

To resolve the difference between the actual data rate and the programmed rate, the IEEE 802.1Qav standard specifies that the programmed rate of the flow and class or the combined shapers $f_f$ in this case, is to be faster than a requested data rate. The combined shapers $f_f$ are operated based on an overestimated frame size to assure that the combined shapers $f_f$ are operating at a rate faster than requested. A maximum frame size is estimated to be one byte larger than an actual maximum frame size. This ensures the flow and class or the combined shapers $f_f$ in this case, are faster than the actual data rate.

The increased rate of the combined shapers $f_f$ may be used in talkers, where data flows are self-shaping (or self-pacing). A self-shaped data flow is one where the frames are generated and transmitted as the data arrives. An example of a device that generates self-shaped data flows is a microphone. An analog output signal of a microphone may be sampled, digitized and then transmitted to a talker. If the data is sampled and digitized at, for example, a 48 kilo-hertz (KHz) rate, every 6 samples of the data may be packed into an Ethernet frame and then transmitted. Six 48 KHz samples results in an Ethernet frame rate of 8 KHz or a new frame every 125 micro-seconds (μs). The data flow generated is self-shaping as the frame rate of the data flow cannot increase to a rate faster than the 8 KHz+100 ppm, if the crystal of the media clock providing the 48 KHz rate is +100 ppm fast.

If the digitized data samples received from the microphone were stored on storage drive (e.g., a hard drive or a flash drive) and then were later sourced to a talker, the data flow from the storage drive to the talker is not self-shaping. Data is output from the storage drive to the talker as fast as the storage drive can output the data. The combined shapers $f_f$ in the talker (or per-flow shapers) may be the only devices that slow down the transfer rate of the data from the storage drive. Because the combined shapers $f_f$ are not time aware, the combined shapers $f_f$ may slow down the transfer rate of the data close to but not as slow as the media rate. If the rate at which data is transferred out of the combined shapers $f_f$ remains excessive for too long, buffers of the listener receiving the data may overflow. This is because the listener is receiving the data faster than the rate at which the data is being played out (i.e., the media clock rate).

Overflow of buffers in the listener may occur for data flows that are time aware. A data flow that is time aware is a data flow with frames, where the frames include the media clock rate. The media clock rate as indicated by the frames indicates to the listener the times and/or rates at which the frames are to be played out. The IEEE 1722 standard supports such data flows (or data streams) by defining a presentation time in each frame.

As an example, the host control module 112 of the talker 110 may determine a presentation time for a frame of a data stream and incorporate the presentation time in the frame prior to transmitting the frame to a listener. The presentation time is essentially the time when a specific sample in the frame is to be played out. Subsequent frames in the data stream with subsequent presentation times define the media clock rate for the data stream.

The overflowing of the buffers of the listener can be prevented by the host control module 112. The host control module 112 may execute software to delay when frames are presented to the MAC. The host control module 112 can determine that a frame with a given presentation time has gone out early by an amount over a preset threshold. An example threshold is ½ of the media clock rate, or for the above example 62.5 μs for a 48 KHz data stream. When the threshold is exceeded, the host control module 112 delays permitting the transfer of any more frames into a corresponding queue until the corresponding queue is drained (emptied). As soon as the corresponding queue is empty, the host control module 112 may then again start loading newly received frames into the corresponding queue. The threshold needs to be adjusted based on the latency associated with the host control module 112 executing the software. The host control module 112 is time aware, since the host control module 112 is incorporating presentation times into the frames to compensate for the non-time aware aspects of the combined shapers $f_f$.

Figure 4:
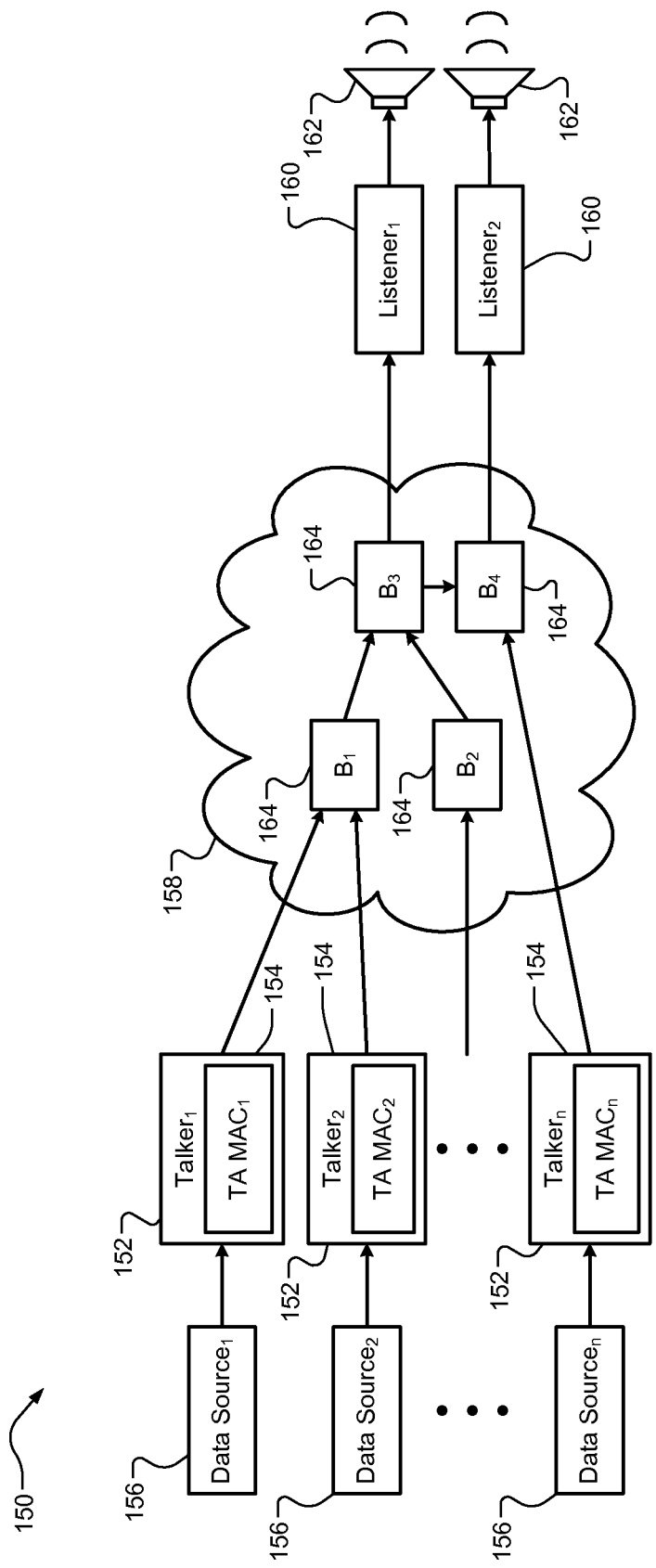
FIG. 4 is a functional block diagram of a non-arbitrary network incorporating talkers with time aware media access control modules (MACs) in accordance with the present disclosure.

FIG. 4 shows a non-arbitrary network 150 incorporating talkers 152 with time aware MACs (hereinafter MACs 154). The non-arbitrary network 150 includes data sources 156, talkers 152, switching network 158 (e.g., an Ethernet cloud defined by the IEEE 802.3 standard or an AVB cloud defined by the IEEE 802.1 standard), listeners 160, and playout devices 162 (e.g., speakers). The data sources 156 may include, for example, microphones, storage drives (e.g., hard drives and flash drives), audio and/or video playback devices (e.g., digital versatile disc players), etc. The talkers 152 receive frames of data from the data sources 156 and include the MACs 154. The MACs 154 process the frames and output the processed frames to the switching network 158. The MACs 154 are time aware as the MACs 154 process the frames based on presentation times and/or transfer times provided in the frames, as is further described below with respect to the implementations of FIGS. 5-13. The switching network 158 includes bridges 164 (or switches) that route the data to the listeners 160. The listeners 160 may play out the data on the playout devices 162.

The bridges 164 may multiplex and/or interleave data received from multiple ones of the talkers 152 and output the combined data at a data rate equal to a sum of output data rates of the talkers 152. A bridge may multiplex and/or interleave data received from multiple bridges in a similar manner. As a result, data received at a listener may be at a data rate that is faster than originally transmitted by a talker. Nevertheless, the listener is to playout the data at a same rate that the data is received by the original data source. For example, a microphone may receive and sample data at a particular rate (e.g., 44.1 kHz). A listener may then playout the data at the same particular rate on a playout device. To accomplish this, frames of the data may include presentation times, as described above.

Figure 5:
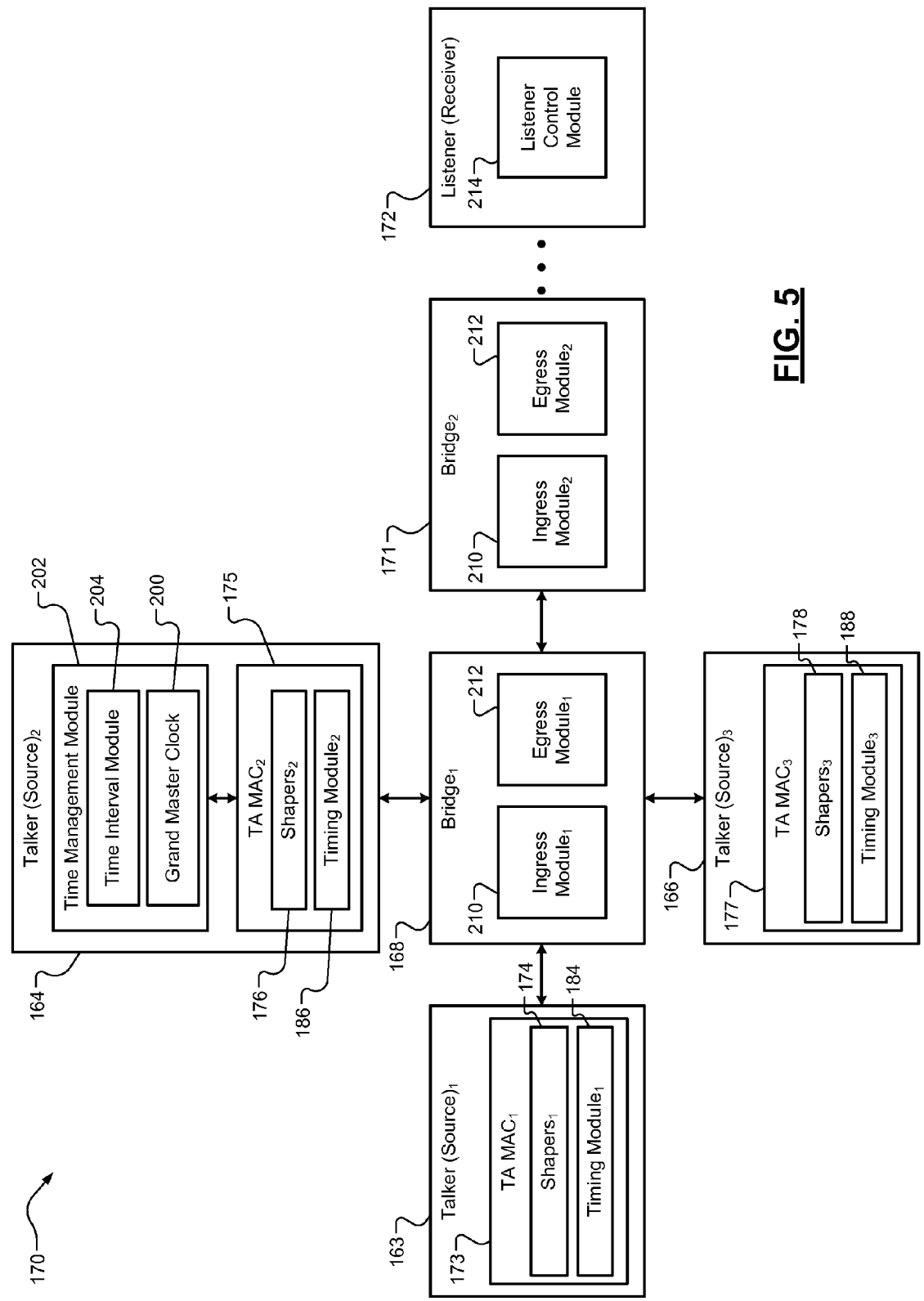
FIG. 5 is a functional block diagram of a portion of the non-arbitrary network of FIG. 4.

FIG. 5 shows a portion of the non-arbitrary network 170. The non-arbitrary network 170 includes one or more talkers (three talkers 163, 164, 166 are shown), one or more bridges (two bridges 168, 171 are shown) and a listener 172. The talkers 163, 164, 166 may be referred to as sources, as the talkers transmit data to the listener 162. The listener 172 may be referred to as a receiver, as the listener 172 receives data from the talkers 163, 164, 166. The bridges 168, 171 may satisfy IEEE 802.1 AS, which provides precise timing protocols (PTPs). The bridges 168, 171 provide a daisy chain of network devices between end stations (e.g., the talkers 163, 164, 166 and the listener 162).

The talkers 163, 164, 166 may each include respective time aware MACs 173, 175, 177. Each of the MACs 173, 175, 177 may include respective blocking shapers 174, 176, 178 and timing modules 184, 186, 188. The combined shapers 174, 176, 178 are not time aware and may spread out transmission of AVB data (e.g., Class A data or Class B data).

One of the network devices (e.g., the second talker 164) in the network 170 may include a grand master clock 200, which generates a global clock signal. The grand master clock 200 may be located in any of the network devices of the network 170. The global clock signal may be shared with any of the network devices in the network 170. As an example, the grand master clock 200 is shown in the second talker 164, but may be located in one of the other talkers 163, 166, one of the bridges 168, 171, the listener 172, or other network device connected to the network 170. The timing modules 184, 186, 188 may generate respective local clock signals.

The network device that includes the grand master clock 200 or one of the other network devices in the network 170 may include a time management module 202. The network device having the grand master clock 200 and/or the time management module 202 may be referred to as a master device. Devices not having the grand master clock 200 and/or the time management module 202 may be referred to as slave devices. The time management module 202 may include the grand master clock 200 and/or a time interval module 204. The time interval module 204 may set the periodic transmission time interval (i.e. duration of the periodic transmission time interval) and start times of each of the periodic transmission time intervals. The global clock signal, the periodic transmission time interval and the start times of the periodic transmission time intervals may be shared between the network devices using a management information base (MIB) modules and/or a simple management network protocols (SMNPs). The time may also be communicated to each of the devices in the network by using the 802.1AS Precise Timing Protocol.

The bridges 168, 171 may include respective ingress modules 210 and egress modules 212. The ingress modules 210 may receive data from an upstream device, such as a talker or other bridge and forward the data to the egress modules 212. The egress modules 212 may perform data shaping (spreading out of the data) and/or forward the data to a downstream device, such as another bridge or listener.

The listener 172 receives data from the talkers 163, 164, 166 via the bridges 168, 171. The listener 172 may include a listener control module 214. The listener control module 214 may operate and/or monitor or operate one or more sensors, motors, actuators, or other devices of the network based on the data received from the talkers 163, 164, 166. The listener 172 may playout the data on a playout device (e.g., one of the playout devices 162 of FIG. 4).

The talkers 163, 164, 166, bridges 168, 171, and/or listener 172 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and 802.20.

Figure 6:
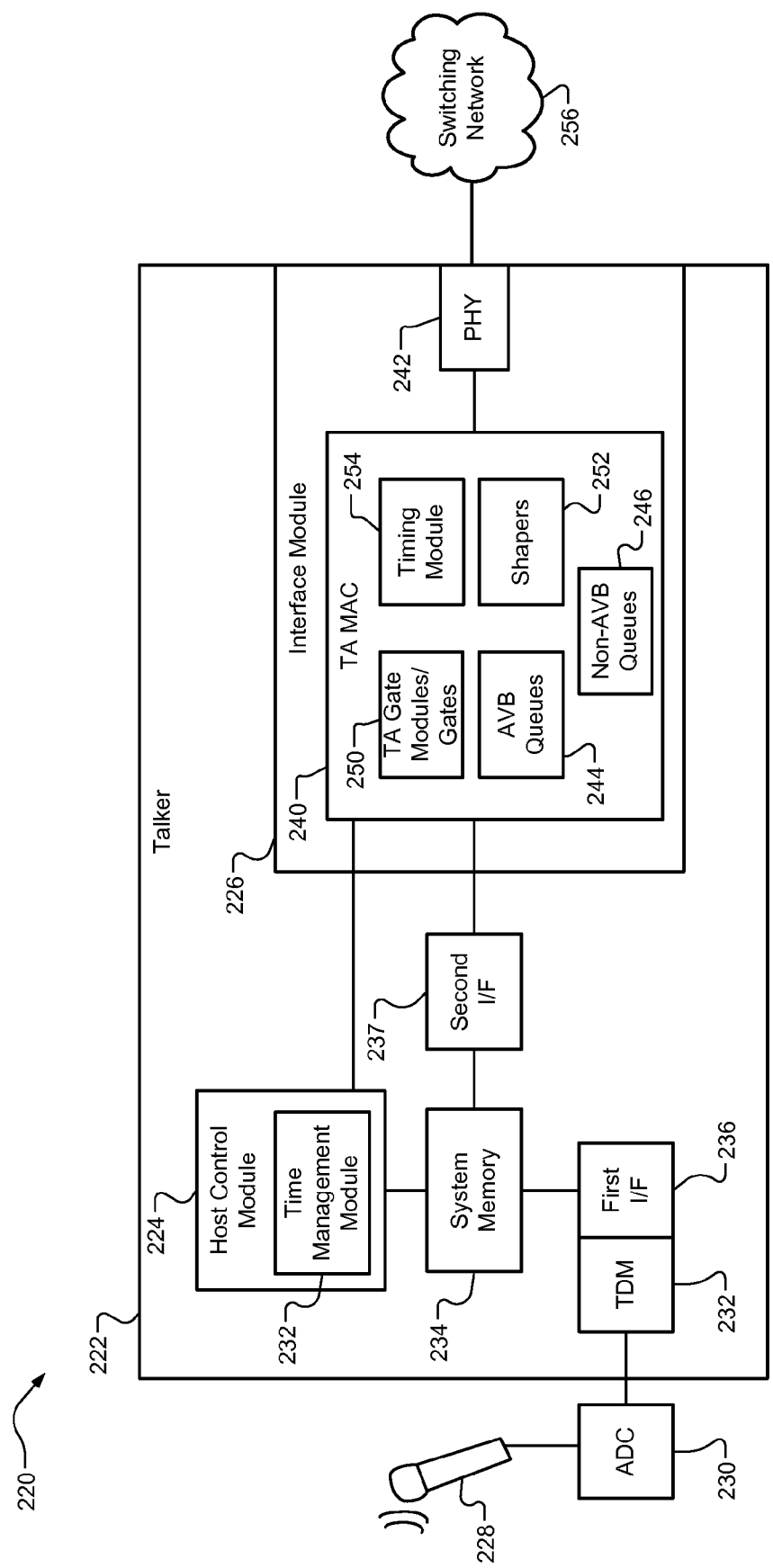
FIG. 6 is a functional block diagram of a recording network including a talker in accordance with the present disclosure.

FIG. 6 shows a recording network 220 including a talker 222. The talker 222 may be, for example, one of the talkers 163, 164, 166 of FIG. 4. The talker 222 includes a host control module 224 and an interface module 226. The host control module 224 may include, for example, a processor and receive data of different priority levels from a data source 228 (shown as a microphone in this example) and provide the data to the interface module 226. The data may include Class A data, Class B data, and non-AVB data.

The data source 228 generates an output signal, which may be sampled by an analog-to-digital converter 230 and provided to a time-division multiplexer (TDM) 232. The TDM 232 multiplexes the sampled data and provides the multiplexed data to a system memory 234 via a first interface 236. The host control module 224 has ownership of the multiplexed data when stored in the system memory 234. The ownership of the data may be transferred to the interface module 226 when the data is to be transferred to the interface module 226. Data may be transferred from the system memory 234 to the interface module 226 via a second interface 237. The host control module 224 may signal the interface module 226 when ownership of the data is being transferred. The interface module 226 may then access the data from the system memory 234.

The host control module 224 may include a time management module 238 (e.g., the time management module 202 of FIG. 5). The time management module 202 may determine presentation times and/or generate descriptors for frames of data transferred from the system memory 234 to the interface module 226. The presentation times and/or descriptors may be generated based on a global clock signal. The presentation times may be generated in accordance with IEEE 1722. IEEE 1722 requires that talkers insert presentation times into frames of data, if the frames of data are generated based on media samples (e.g., audio data samples). The media samples are played back at a listener and at a media clock rate of the talker. This allows a listener to be able to play back the frames of data without buffer underflow or overflow issues.

The presentation time for Class A data streams may be determined based on a default transmission time. The default presentation time may be set based on a predetermined maximum amount of time for data to transfer through a predetermined number of hops in a network to compensate for a worst case latency of the network. As an example, the presentation time and/or default transmission time may be equal to the latency (e.g., 2 milliseconds (ms)) for a Class A frame to be transferred from a talker to a listener. The duration of the presentation time starts when the host control module 224 transfers ownership of a frame of data to the interface module 226. The presentation time provided for each frame minus the default transmission time matches a time when the ownership of that frame is transferred from the host control module 224 to the interface module 226.

A data stream may have any number of packets. Each packet may include a predetermined number of frames of data. The packets and the descriptors may be stored in the system memory 234 and provided to the interface module 226. The frames and/or packets may be linked together via the descriptors. These descriptors help the interface module 226 burst the frames out quickly without intervention by the host control module 224.

Each of the descriptors may include a descriptor timestamp (or transfer time) and/or other information, such as a size of a corresponding packet and/or frame, a start time of a periodic transmission time interval, a length of the periodic transmission time interval, and/or source and/or destination addresses. The transfer time may indicate a time when: a frame is to be transferred from the system memory 234 to the interface module 226; the frame is to be transferred to a queue in the interface module 226; and/or ownership of the frame is to be transferred from the host control module 224 to the interface module 226. The transfer time may be in a different format than the presentation time and/or may be generated based on the presentation time. The transfer time may be valid or invalid. The transfer time or transfer time field of a descriptor may be valid, for example, (i) when a transfer time is provided, (ii) is marked as valid, (iii) when the transfer time is in a correct format; and/or (iv) the transfer time corresponds with a presentation time such that the rate the frame is transferred and then played out matches the media rate.

The interface module 226 may be, for example, a NIC or other suitable interface. A NIC refers to a card or circuit which includes a time aware MAC 240 and a PHY device 242. The time aware MAC 240 and PHY device 242 may be Ethernet devices. The MAC 240 may include AVB queues 244, non-AVB queues 246 and associated logic devices to transmit and receive frames to and from the host control module 224.

Figure 7:
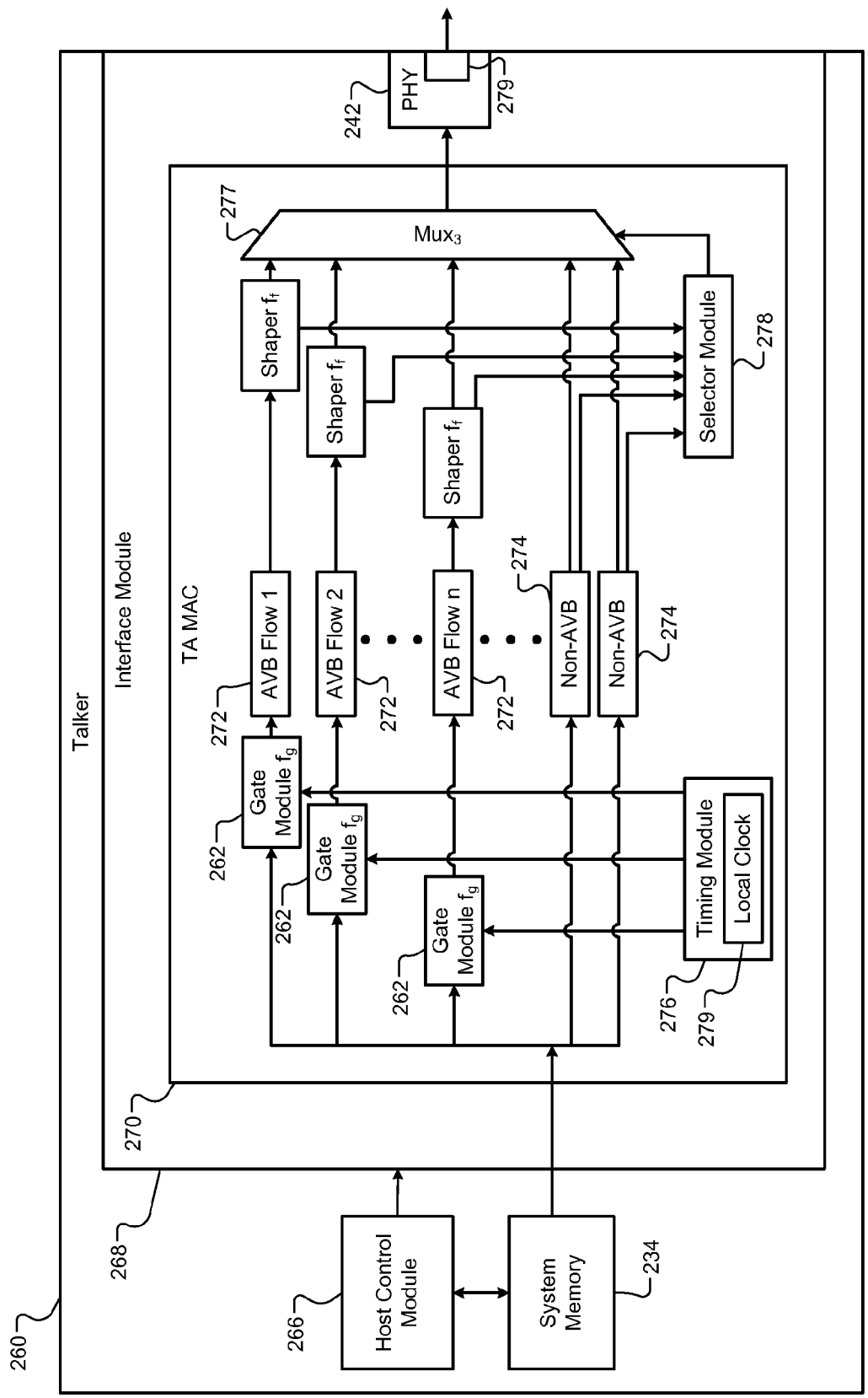
FIG. 7 is a functional block diagram of a talker incorporating time aware gate modules and shaping modules in accordance with the present disclosure.
Figure 8:
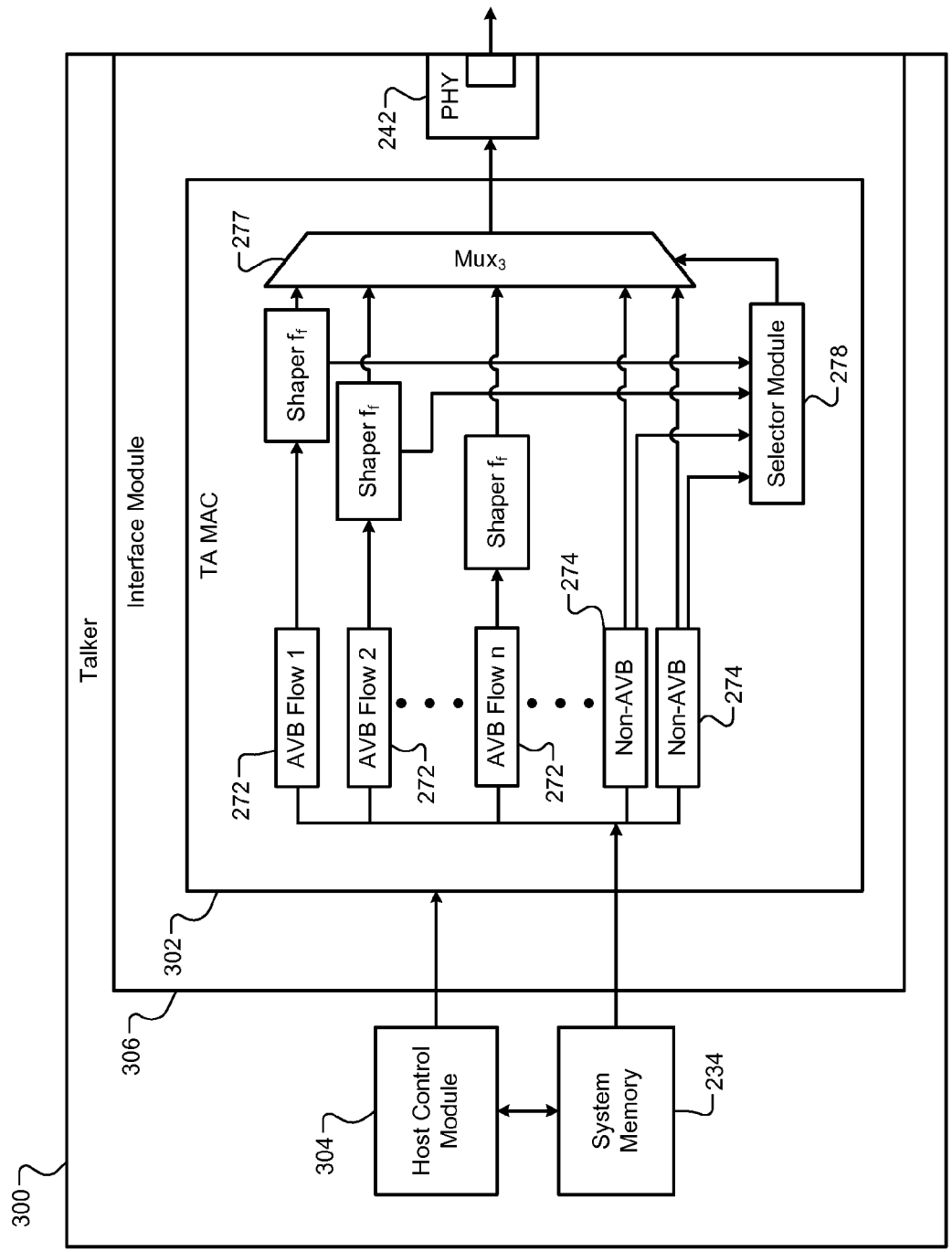
FIG. 8 is a functional block diagram of a talker with a non-time aware MAC in accordance with the present disclosure.
Figure 9:
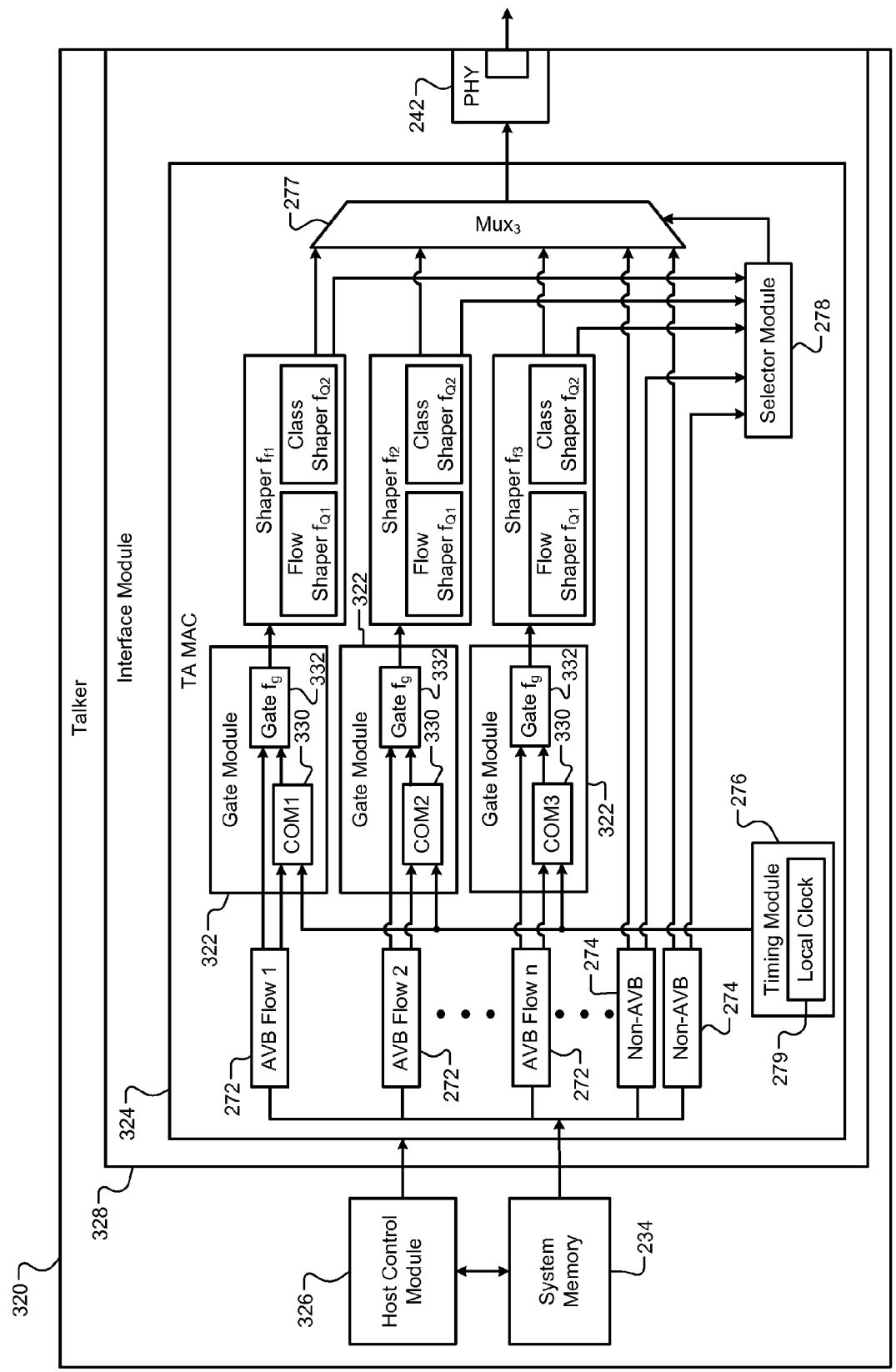
FIG. 9 is a functional block diagram of another talker incorporating time aware gates and shaping modules downstream of queues of a time aware MAC.

The time aware MAC 240 may include time aware gate modules and/or gates 250, the queues 244, 246, blocking shapers 252 (e.g., the blocking shapers 174, 176, 178 of FIG. 5), and/or a timing module 254 (e.g., one of the timing modules 184, 186, 188 of FIG. 5). FIGS. 7 and 9 provide example implementations including time aware gate modules and gates, queues, blocking shapers, and/or a timing module. FIG. 8 provides an example implementation including queues and blocking shapers and not including time aware gate modules, time aware gates and a timing module.

The talker 222 including the host control module 224 and the time aware MAC 240 provide a hardware approach to matching a transmit rate of a data stream to a media clock rate. Traditionally, a host control module of a talker when done generating and storing a frame in a system memory, transfers ownership of that frame to a NIC. The NIC then starts processing the frame and transmitting the frame, if a corresponding output of a MAC is idle. The time aware gate modules and/or gates 250 delay processing of frames by masking the ownership of the frames. The time aware gate modules and/or gates 250 mask the ownership of the frames until a predetermined times and/or transfer times as indicated by descriptors of the frames.

If a transfer time of a descriptor of a frame indicates the frame is valid and/or a time aware gate module determines that the transfer time is valid, ownership of the frame may not be transferred. The ownership may not be transferred from the host control module 224 to the time aware MAC 240 until a local time (e.g., IEEE 802.1AS time), generated by a local clock, is equal to or greater than the transfer time of the descriptor. The timing module 254 may generate a local clock signal indicating the local time. As a result, the frames are received at the AVB queues 244 and blocking shapers 252 at appropriate predetermined times for media rates of the frames.

The AVB queues 244 receive the frames from the system memory 234 based on the transfer times of the frames and then release the data to the blocking shapers 252. The combined shapers 252 spread the data over time, as described above. The combined shapers 252 then forward the frames of data to the PHY device 242, which outputs the data to a switching network 256.

FIG. 7 shows a talker 260 incorporating time aware gate modules 262 (also identified as gate modules $f_g$) and combined g shapers $f_f$. The talker 260 includes a host control module 266, the system memory 234, and an interface module 268. The interface module 268 may be, for example, a NIC and includes a time aware MAC 270 and the PHY device 242. The MAC 270 receives the data from the system memory 234 and distributes the data to respective AVB queues 272 and non-AVB queues 274 of the time aware MAC 270 based on the class of the data. The time aware MAC 270 may receive frames of data from the system memory 234, parse the frames and associated descriptors based on headers provided in the frames.

The time aware MAC 270 includes the time aware gate modules 262, a timing module 276, the queues 272, 274, combined shapers $f_f$, a multiplexer 277, and a selector module 278. The time aware gate modules 262 and blocking shapers $f_f$ are provided for AVB data and not for non-AVB data. Prior to the frames of data being transferred to the AVB queues 272, the time aware gate modules 262 mask the ownership of the frames by gating the frames based on timestamps of the frames. The ownership is masked until a predetermined time and/or a transfer time as indicated by descriptors of the frames. The time aware gate modules 262 may convert the presentation time to transfer time and/or compare the transfer time to a local time as indicated by a local time signal from the timing module 276. The local time signal may be generated based on a local clock 279.

The combined shapers $f_f$ may be combined flow and class shapers, such that they are capable of performing both per-flow shaping and per-class shaping. In operation, AVB data is provided from the system memory 234 to the time aware gate modules 262. The time aware gate modules 262 permit passage of the AVB data to the AVB queues 272, which then release the AVB data to the combined shapers $f_f$. Prior to forwarding the AVB data to the multiplexer 277, the combined shapers $f_f$ then spread the data.

The multiplexer 277 selects data from the combined shapers $f_f$ and the non-AVB queues 274 based on a control signal from the selector module 278 and outputs the data to an egress port 279 of the PHY device 242. The selector module 278 may be a strict selector and may select data from the combined shapers $f_f$ and the non-AVB queues 274 based on priority level of the data and/or corresponding queue. When multiple ones of the combined shapers $f_f$ and the non-AVB queues 274 have data that is ready to be transmitted, the combined shaper or queue having the highest priority level may be selected.

If all time descriptors of frames with AVB data are marked as valid, then the talker may not include the combined shapers $f_f$. In order to maintain proper timing of the frames, the host control module 266 computes transfer times for each of the frames due to the lack of the combined shapers $f_f$. As a result, there is increased overhead for the host control module 266. Also, if more than one data stream is being transmitted at the same time, and at different rates, the complexity associated with controlling the timing of the frames increases. This is because the host control module 266 shifts competing data streams of the same class in time similar to the functions of per-class shapers. In addition, if the combined shapers $f_f$ are not included, the non-AVB data also needs to be time scheduled such that AVB data bursts can be scheduled. While it is possible to schedule the AVB data and the non-AVB data by incorporating transfer times in descriptors of all frames, determining the transfer times is a complex problem to solve in real time.

The implementation of FIG. 7 including the use of the time aware gate modules 262 and combined shapers $f_f$ offloads the host control module 266. For this implementation, the host control module 266 may determine a transfer time and generate a descriptor for valid frames or frames with valid transfer times. The host control module 266 may determine the transfer time for all frames. However, the transfer times of a first class of data may not be determined based on transfer times of other classes of data. This is because each of the time aware gate modules 262 and/or combined shapers $f_f$ may operate (i) based on the transfer times for the corresponding data stream and class of the data stream, and (ii) not based on transfer times of other data streams and/or other classes of data streams. This simplifies the calculations of the transfer times. Multiple data streams of the same class of data can enter a queue during the same time period (e.g., a local time or IEEE 802.1AS time) and the combined shapers $f_f$ may then insure proper spreading and timing of the data streams according to IEEE standards.

Software overhead of the host control module 266 can be further reduced by not computing a transfer time for every frame of a data stream. Since the combined shapers $f_f$ are included and may include per-flow shapers, the combined shapers $f_f$ can be used to spread out bursts of data when not every frame in a data stream has a descriptor with a valid transfer time. This allows the frames of a data stream to be periodically delayed by the time aware gate modules 262 based on the valid transfer times, which minimizes overhead of the host control module 266 and prevents buffer overflow in a listener. The valid transfer times may be calculated periodically based on a predetermined period. The predetermined period may have a pseudo-random duration or a random duration. The predetermined period may be fixed or may be adjusted.

As stated above, the combined shapers $f_f$ are not time aware and therefore may have corresponding rates set faster (e.g., a byte faster) than a media clock rate (or playout rate). Because of this, a valid transfer time may be periodically provided in descriptors of frames of a data stream. When a valid transfer time is detected by a time aware gate module, the frame and corresponding data stream is stalled. As a result, the frame is not permitted to enter a corresponding AVB queue of the time aware MAC 270 until a local time is a same time or a later time than the transfer time. This periodic adjustment insures that buffers of a listener do not overflow. Since the valid transfer times are provided periodically, associated processing time of the host control module 266 is reduced, as transfer times are not computed for each frame.

The local clock and/or the timing module 276 may include a counter, such as a 32-bit counter operating at a rate based on a local crystal oscillator. The counter may be used to generate the local time (or IEEE 802.1AS time). The local time may be provided to the host control module 266 and used to timestamp the transfer times in the descriptors of the frames transferred from the system memory 234 to the time aware MAC 270. The frames may be IEEE 802.1AS frames.

The host control module 266 may use IEEE 802.1AS protocols to become aware of a direct current (DC) offset and/or ppm offset associated with a difference between the local time and a global (or master) time. This allows the host control module 266 to translate the local time to a global time and/or a global time to a local time. One or more of these translations may be used when generating the presentation times and/or the transfer times and/or when determining a media rate. For example, the presentation times of IEEE 1722 frames may be locked to the global time. The host control module 266 may convert the presentation times to local times: when using the presentation times; determining the media rate; and/or when generating the transfer times.

The time aware gate modules 262 may compare times provided by the counter to transfer times in descriptors, if the transfer times are marked as valid in the descriptors. By using the same hardware timer (i.e. the counter) for time stamping of the frames and time aware gating of the frames prevents the host control module 266 from performing time translations. This is because the time stamping and the time aware gating are performed using the same timer. Also, the calibrated values and/or equations used to perform the translations may change over time if frequency or ppm value of the local crystal changes. The frequency and/or ppm value of the local oscillator can change, for example, due to temperature changes. The calibrated values and/or equations may be adjusted over time to maintain synchronization of network devices and proper transfer and playout rates of frames.

In one implementation, a presentation time may be converted by the host control module 266 using hardware and/or software to a transfer time after subtracting a predetermined amount of network latency time from the presentation time. The presentation time when originally generated may have included the network latency time. In another implementation, a transfer time is initially determined and then a presentation time is determined based on the transfer time. A network latency time may be added to the transfer time prior to or subsequent to converting the transfer time to the presentation time.

FIG. 8 shows a talker 300 with a non-time aware MAC 302 that provides time aware gating without inclusion of time aware gate modules, time aware gates and/or a timing module. The talker 300 includes a host control module 304, the system memory 234 and an interface module 306. The host control module 304 changes ownership of frames in the system memory 234 from the host control module 304 to the interface module 306. The interface module 306 includes a time aware MAC 302 and the PHY device 242. The time aware MAC 302 includes the AVB queues 272, the non-AVB queues 274, the combined shapers $f_f$, the multiplexer 277, and the selector module 278. The queues 272, 274 may receive frames directly from the system memory 234.

Functions of the time aware gate modules 262 of FIG. 7 may be effectively implemented by the host control module 304 using hardware and/or software. The host control module 304 may delay providing frames to the AVB queues 272 when descriptors of the frames have valid transfer times. In one implementation, the host control module 304 may periodically delay the transfer of AVB frames without determining whether the frames have valid transfer times. This delay may be based on a predetermined period. The predetermined period may have a pseudo-random duration or a random duration. The predetermined period may be fixed or may be adjusted. The frames stored in the system memory 234 may not include transfer times. The frames stored in the system memory 234 may include presentation times, which may be used by a listener downstream of the talker 300 when playing out the frames.

FIG. 9 shows another talker 320 incorporating time aware gate modules 322 and the combined shapers $f_f$. The combined shapers $f_f$ are in a time aware MAC 324 and downstream of the AVB queues 272. The talker 320 includes a host control module 326, the system memory 234, and an interface module 328. The host control module 326 transfers ownership of the frames from the host control module 326 to the interface module 328 and/or the time aware MAC 324 similar to the host control module 266 of FIG. 7. The interface module 328 includes the time aware MAC 324 and the PHY device 242.

The time aware MAC 324 includes the AVB queues 272, the non-AVB queues 274, time aware gate modules 322, the timing module 276, the combined shapers $f_f$ the multiplexer 277, and a selector module 278. The queues 272, 274 may receive frames directly from the system memory 234. The time aware gate modules 322 include comparators 330 and time aware gates 332. The comparators 330 compare valid transfer times of head-of-line frames in the AVB queues 272 to a local time provided by the local clock 279 of the timing module 276. If a local time is the same as or later than a valid transfer time of a frame, the output of the corresponding comparator receiving the valid transfer time may be, for example, HIGH. This indicates that the frame corresponding to the valid transfer time may be forwarded to a corresponding one of the combined shapers $f_f$. A time aware gate corresponding to the comparator receiving the valid transfer time may then transfer the frame to the corresponding one of the combined shapers $f_f$.

The combined shapers $f_f$ may include per-flow shapers (identified as $f_{Q1}$) and per-class shapers (identified as $f_{Q2}$). The per-flow shapers $f_{Q1}$ spread out data in a received stream. Each of the per-flow shapers $f_{Q1}$ operates without status information of other shapers. The per-class shapers $f_{Q2}$ may further spread out or shift in time data received from the per-flow shapers $f_{Q1}$. The per-class shapers $f_{Q2}$ may have status information of other per-class shapers of the same class. As an alternative to having a per-class shaper for each AVB queue of a same class, a single per-class shaper may be used and receive all outputs of the AVB queues of the same class. An example of this is shown in FIG. 10.

The multiplexer 277 selects data output from the per-class shapers $f_{Q2}$ and the non-AVB queues 274 based on a control signal from the selector module 278. The multiplexer 277 outputs the selected data to the PHY device 242.

Figure 10:
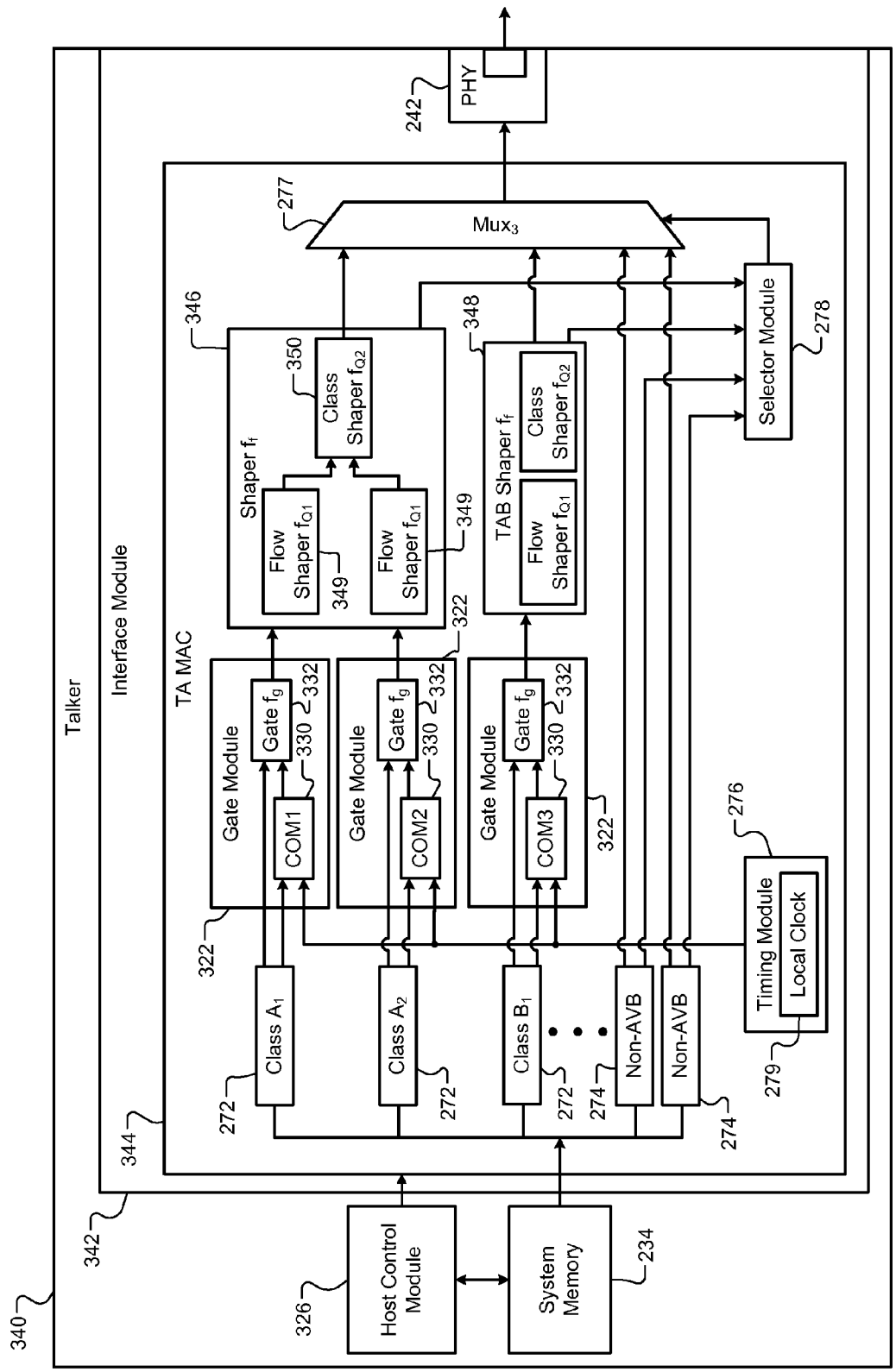
FIG. 10 is a functional block diagram of another talker incorporating time aware gate modules and a single per-class shaper for each class of AVB data.

FIG. 10 shows a talker 340 incorporating the time aware gate modules 322 and a single per-class shaper for each class of AVB data. The talker 340 includes the host control module 326, the system memory 234, and an interface module 342. The host control module 326 transfers ownership of the frames from the host control module 326 to the interface module 342 and/or a time aware MAC 344 similar to the host control module 266 of FIG. 7. The interface module 344 includes the time aware MAC 344 and the PHY device 242.

The time aware MAC 344 includes the AVB queues 272, the non-AVB queues 274, the time aware gate modules 322, the timing module 276, combined shapers 346, 348, the multiplexer 277, and a selector module 278. The queues 272, 274 may receive frames directly from the system memory 234. The time aware gate modules 322 include the comparators 330 and the time aware gates 332.

The combined shapers 346, 348 may include per-flow shapers (identified as $f_{Q1}$) and per-class shapers (identified as $f_{Q2}$). The per-flow shapers $f_{Q1}$ spread out data in a received stream. Each of the per-flow shapers $f_{Q1}$ operates without status information of other shapers. The per-class shapers $f_{Q2}$ may receive data from one or more per-flow shapers $f_{Q1}$ of the same class and may further spread out or shift in time the data received from the per-flow shapers $f_{Q1}$. The per-class shapers $f_{Q2}$ may not have status information of other per-class shapers.

The combined shaper 346 includes per-flow shapers 349 for each AVB queue and/or each time aware gate module 322 of a same class. The combined shaper 346 includes a single per-class shaper 350. The per-class shaper 350 receives frames of the per-flow shapers 349 of the combined shaper 346 and arbitrates conflicts between bits of data received at the per-class shaper 350 at the same time. Since the per-flow shapers 349 are not time aware, the per-class shaper 350 may receive bits of data from each of the per-flow shapers 349 at the same time. The per-class shaper 350 may interleave and spread out the data received from the per-flow-shapers 349 while arbitrating timing conflicts that can arise between outputs of the per-flow shapers 349. If bits are received from the per-flow shapers 349 at the same time, the per-class shaper 350 determines which of these bits to transmit first. This determination may be based on, for example, (i) presentation times and/or transfer times corresponding to frames and/or descriptors of the bits, and/or (ii) other information in the descriptors.

The data rate into the queues 272 may be quicker than the data rate out of the combined shaper 346. For this reasons, the per-flow shapers 349 may be deactivated by the time aware MAC 344. In one implementation, the per-flow shapers 349 are not included or are deactivated, such that the per-flow shapers 349 are pass through devices and do not perform shaping (or spreading) of data over time. The host control module 326 and the gate modules 322 may essentially provide per-flow shaping by (i) adjusting when the host control module 326 transfers ownership of the frame to the time aware MAC 314 and (ii) gating the frames based on timestamps corresponding to the frames. The timestamps may include the presentation times or the transfer times. In another implementation, the per-flow shapers 349 are (i) activated for frames that do not include a timestamp, a presentation time, a transfer time, and/or a valid timestamp, and (ii) deactivated for frames that include a timestamp, a presentation time, a transfer time, and/or a valid timestamp.

In one implementation, the host control module 326 provides presentation times and/or transfer times for certain frames and not for other frames. The presentation times and/or transfer times may be provided periodically or based on a predetermined period, which may be set by the host control module 326. The predetermined may be pseudo-random, random, fixed and/or adjusted.

The multiplexer 277 selects data output from the per-class shapers $f_{Q2}$ and the non-AVB queues 274 based on a control signal from the selector module 278. The multiplexer 277 outputs the selected data to the PHY device 242.

Figure 11:
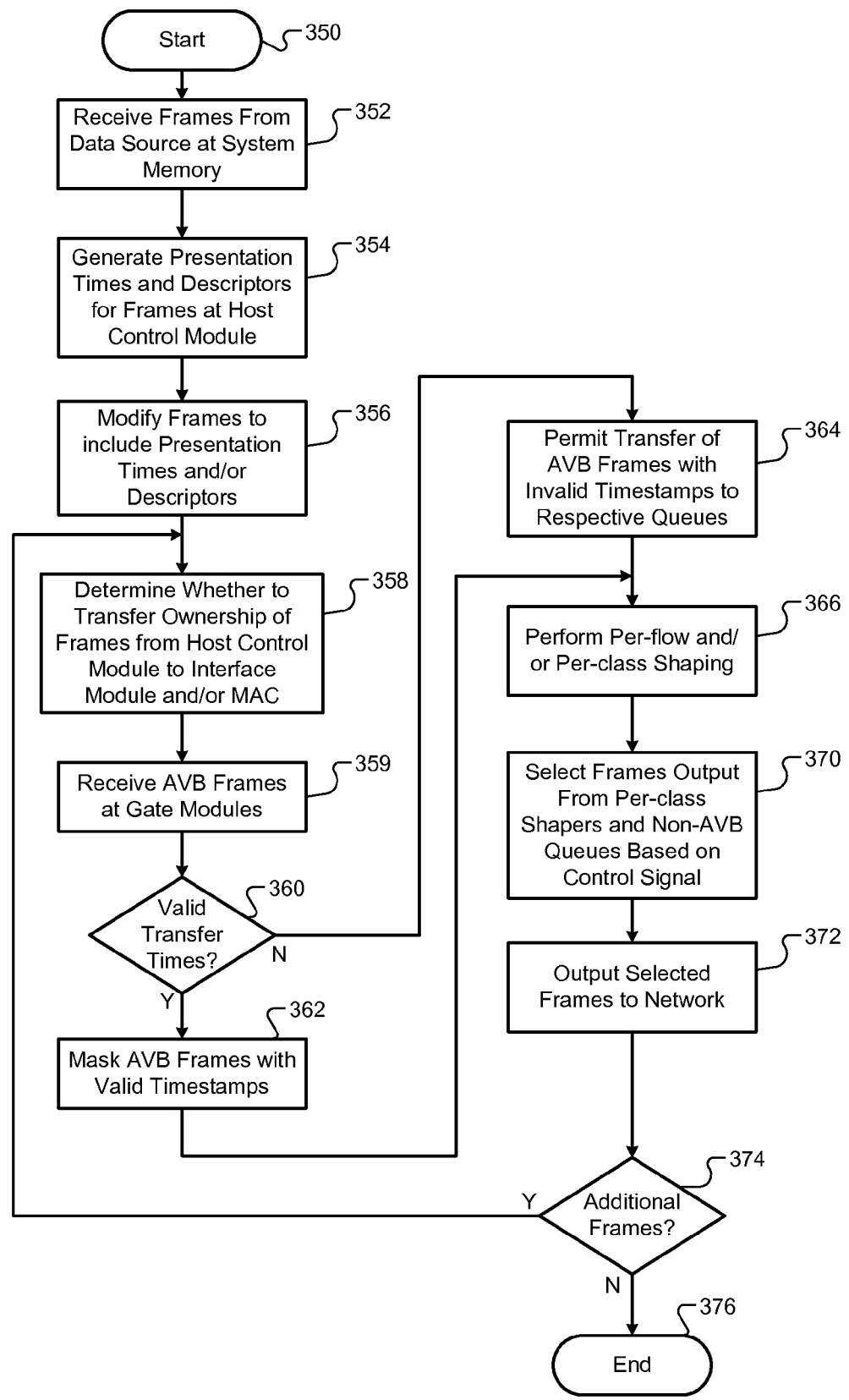
FIG. 11 illustrates a frame shaping method with pre-queue time aware gating performed in a MAC.
Figure 12:
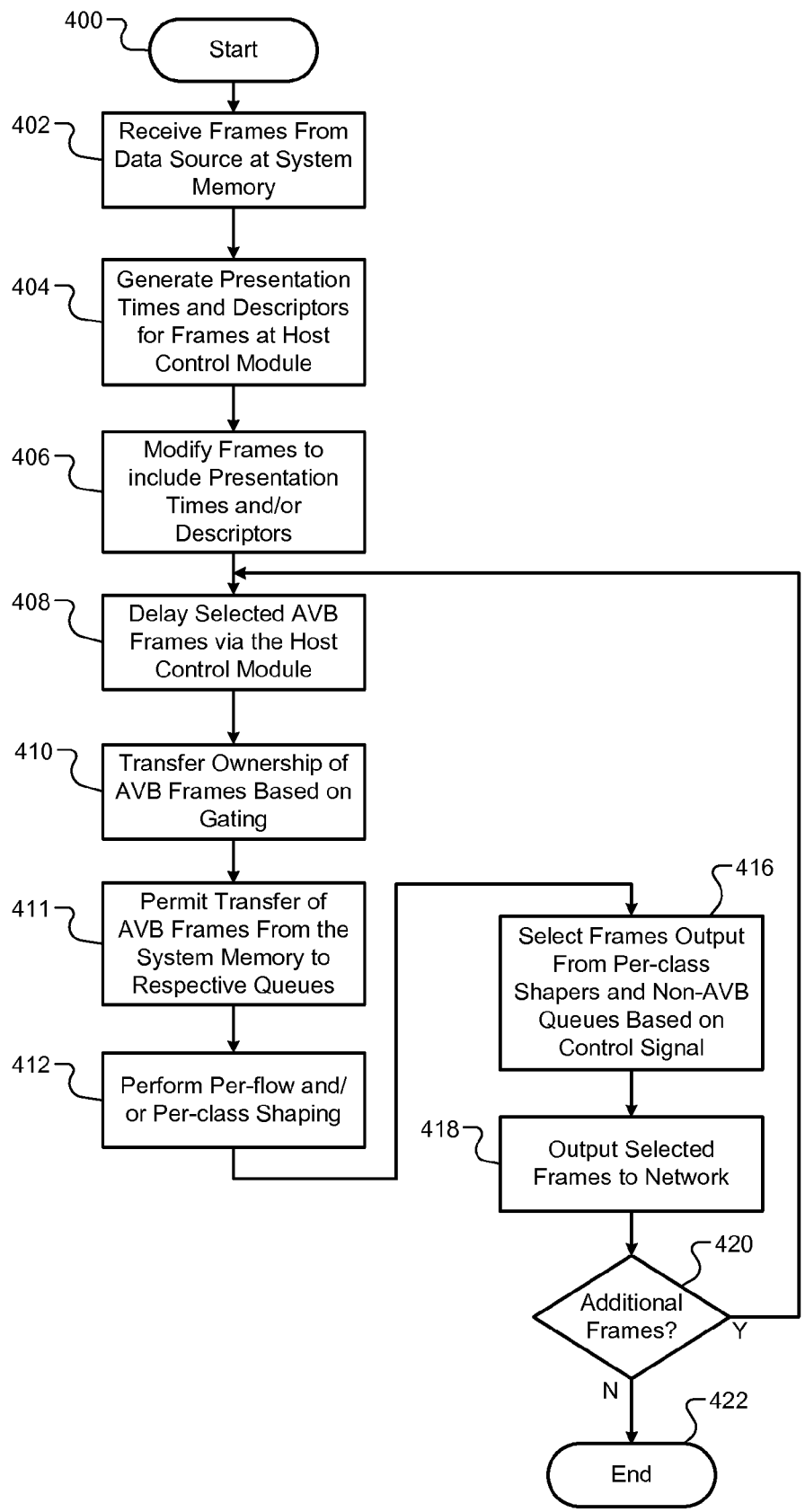
FIG. 12 illustrates a frame shaping method with time aware gating via a host control module.
Figure 13:
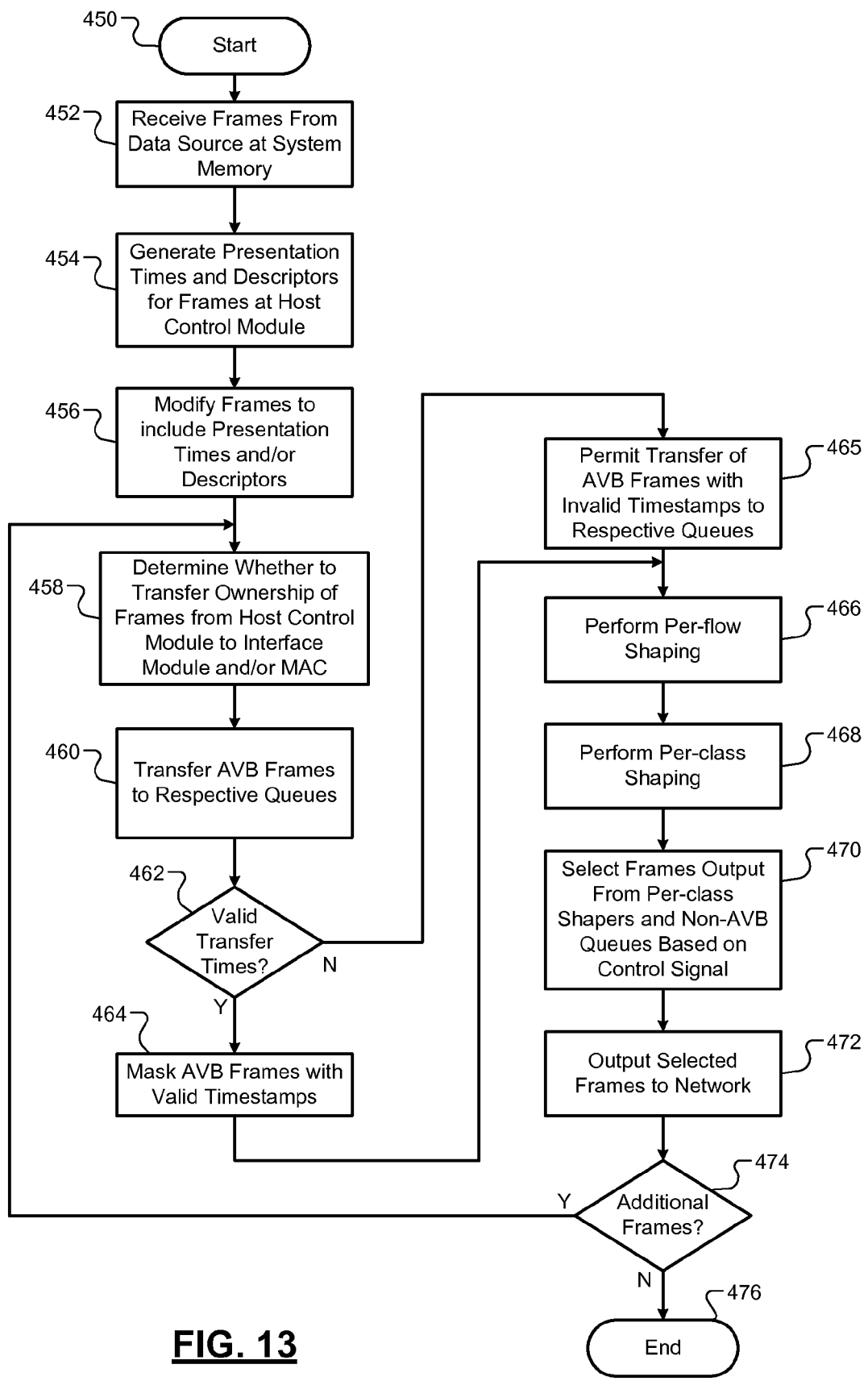
FIG. 13 illustrates a frame shaping method with post-queue time aware gating performed in a MAC.

The above-described talkers of FIGS. 4-10 may be operated using numerous methods, example methods are illustrated in FIGS. 11-13. The below-described tasks of FIGS. 11-13 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

FIG. 11 illustrates a frame shaping method with pre-queue time aware gating performed in a MAC. Although tasks of the method of FIG. 11 are primarily described with respect to the implementation of FIG. 7, the tasks may be easily modified to apply to other implementations of the present disclosure. Although the following tasks are described with respect to transferring multiple frames. The tasks may be performed for one or more frames. The tasks may be iteratively performed and may begin at 350.

At 352, the system memory 234 may receive frames of data from a data source. At 354, the host control module 266 generates timestamps including presentation times and/or transfer times for one or more of the frames and stores the timestamps with the frames in the system memory 234. The host control module 266 may generate descriptors as described above to include the timestamps. At 356, the frames may be modified to include the timestamps. For example, headers of the frames may be modified to include the timestamps. The frames may be modified to include the descriptors.

At 358, the host control module 266 determines whether to transfer ownership of the frames from the host control module 266 to the time aware MAC 270. The host control module 266 may signal the time aware MAC 270 when ownership of a frame has been transferred. At 359, the gate modules 262 access the system memory 234 and receive AVB frames from the system memory 234. Non-AVB frames may be transferred and stored in the non-AVB queues 274.

At 360, the gate modules 262 determine whether the AVB frames include valid timestamps. If the AVB frames include valid timestamps (valid presentation times and/or transfer times), task 362 may be performed, otherwise task 364 is performed. At 362, the gate modules 262 mask the ownership of the AVB frames with valid timestamps by gating these frames based on the valid timestamps and a local time from the timing module 276. Task 366 may be performed subsequent to task 362.

At 364, the gate modules 262 permit transfer of the AVB frames without valid timestamps to respective queues 272 without masking the transfer of ownership of these frames. At 366, the combined shapers $f_f$ shape the AVB frames with or without valid timestamps. This may include per-flow shaping and/or per-class shaping.

At 370, the multiplexer 277 selects outputs of the combined shapers $f_f$ and the non-AVB queues 274 based on a control signal from the selector module 278. At 372, the multiplexer 277 transfers the selected output of the combined shapers $f_f$ and the non-AVB queues 274 to the PHY device 242. At 374, the host control module 266 may determine whether there are additional frames to transfer. If there are additional frames to transfer, task 358 may be performed, otherwise the method may end at 376. As an alternative, task 352 may be performed subsequent to task 372 without performing tasks 374, 376.

FIG. 12 illustrates a frame shaping method with time aware gating performed via a host control module. Although tasks of the method of FIG. 12 are primarily described with respect to the implementation of FIG. 8, the tasks may be easily modified to apply to other implementations of the present disclosure. Although the following tasks are described with respect to transferring multiple frames. The tasks may be performed for one or more frames. The tasks may be iteratively performed and may begin at 400.

At 402, the system memory 234 may receive frames of data from a data source. At 404, the host control module 304 may generate timestamps including presentation times for one or more of the frames and stores the timestamps with the frames in the system memory 234. The host control module 304 may generate descriptors as described above to include the timestamps. At 406, the frames and/or descriptors may be modified to include the timestamps.

At 408, the host control module 304 determines whether to transfer ownership of the frames from the host control module 304 to the time aware MAC 270. This may include delaying selected ones of AVB frames to effectively provide gating of the selected AVB frames. At 410, the host control module 304 transfers ownership of the AVB frames based on the gating performed. The host control module 304 may signal the time aware MAC 302 when ownership of a frame has been transferred. At 411, the time aware MAC 302 may access the AVB frames from the system memory 234 based on the gating and store the AVB frames in respective ones of the queues 272. Non-AVB frames may be transferred and stored in the non-AVB queues 274.

At 412, the combined shapers $f_f$ shape the AVB frames. This may include per-flow shaping and/or per-class shaping. At 416, the multiplexer 277 selects outputs of the combined shapers $f_f$ and the non-AVB queues 274 based on a control signal from the selector module 278. At 418, the multiplexer 277 transfers the selected output of the combined shapers $f_f$ and the non-AVB queues 274 to the PHY device 242. At 420, the host control module 304 may determine whether there are additional frames to transfer. If there are additional frames to transfer, task 408 may be performed, otherwise the method may end at 422. As an alternative, task 404 may be performed subsequent to task 418 without performing tasks 420, 422.

FIG. 13 illustrates a frame shaping method with post-queue time aware gating performed in a MAC. Although tasks of the method of FIG. 13 are primarily described with respect to the implementation of FIGS. 9-10, the tasks may be easily modified to apply to other implementations of the present disclosure. Although the following tasks are described with respect to transferring multiple frames. The tasks may be performed for one or more frames. The tasks may be iteratively performed and may begin at 450.

At 452, the system memory 234 may receive frames of data from a data source. At 454, the host control module 326 generates timestamps including presentation times and/or transfer times for one or more of the frames and stores the timestamps with the frames in the system memory 234. The host control module 326 may generate descriptors as described above to include the timestamps. At 456, the frames and/or descriptors may be modified to include the timestamps.

At 458, the host control module 326 determines whether to transfer ownership of the frames from the host control module 326 to the time aware MAC 324 or 344. The host control module 326 may signal the time aware MAC 324 or 344 when ownership of a frame has been transferred. At 460, the time aware MAC 324 or 344 may access the frames from the system memory 234 and store the frames in respective ones of the queues 272, 274.

At 462, the gate modules 322 determine whether AVB frames include valid timestamps. If the AVB frames include valid timestamps (valid presentation times and/or transfer times), task 464 may be performed, otherwise task 465 is performed. At 464, the gate modules 322 mask the ownership of the AVB frames with valid timestamps by gating these frames based on the valid timestamps and a local time from the timing module 276. Task 466 may be performed subsequent to task 464.

At 465, the gate modules 322 permit transfer of the AVB frames without valid timestamps to respective queues 272 without masking the transfer of ownership of these frames. At 466, the gate modules 322 permit transfer of the AVB frames without valid timestamps to respective queues 272 without masking the transfer of ownership of these frames. At 466, the per-class shapers $f_{Q1}$ and/or 349 may shape the AVB frames with or without valid timestamps on a per-flow basis. At 468, the per-class shapers $f_{Q2}$ and/or 350 may shape the AVB frames received from the per-class shapers $f_{Q1}$ and/or 349 on a per-class basis.

At 470, the multiplexer 277 selects outputs of the combined shapers $f_f$ and/or 346 and the non-AVB queues 274 based on a control signal from the selector module 278. At 472, the multiplexer 277 transfers the selected output of the combined shapers $f_f$ and/or 346 and the non-AVB queues 274 to the PHY device 242. At 474, the host control module 326 may determine whether there are additional frames to transfer. If there are additional frames to transfer, task 458 may be performed, otherwise the method may end at 476. As an alternative, task 452 may be performed subsequent to task 472 without performing tasks 474, 476.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this patent document, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. 1464 The computer programs include processor-executable instructions that are stored on at least one non-transitory tangible computer readable medium. The computer programs may also include and/or rely on stored data.

Further aspects of the present disclosure relates to one or more of the following clauses. A network device is provided and includes a memory, a MAC module, a host control module, and a selector module. The memory is configured to store (i) frames received from a source, and (ii) timestamps corresponding to the frames. The MAC module is configured to (i) receive the frames and the timestamps from the memory, and (ii) forward the frames to a physical layer device. The MAC module includes queues and shaping modules. The queues are configured to store the frames received from the memory. The shaping modules are configured to (i) receive the frames from the queues, and (ii) spread data in the frames over time to generate blocking signals. The host control module is configured to transfer ownership of the frames from the host control module to the MAC module. The host control module or the MAC module is configured to mask the transfer of the ownership of first frames of the frames including gating the first frames based on the timestamps to delay reception of the first frames in the queues. The selector module is configured to (i) select one of the blocking signals, and (ii) forward the selected blocking signal to the physical layer device.

The MAC module includes gate modules. The gate modules are configured to (i) receive the frames from the memory, (ii) mask the transfer of the ownership of the first frames of the frames including gating the first frames to delay reception of the first frames in the queues, and (iii) forward the frames to the queues. The gate modules are configured to compare the timestamps to a local time, and permit transfer of the plurality of frames from the memory to the queues based on the comparisons. Each of the gate modules is configured to permit transfer of one of the frames in response to the local time matching or being later than a corresponding one of the timestamps.

The data in the frames includes audio data, video data or time sensitive control data. The host control module determines presentation times for the frames. The presentation times are times when the frames are to be played out at a playout device. The timestamps may include the presentation times.

The timestamps may include transfer times. The transfer times refer to times when (i) the frames are to be transferred from the memory to the MAC module, (ii) the frames are to be transferred to the queues, or (iii) ownership of the frames are to be transferred from the host control module to the MAC module.

The host control module is configured to (i) determine the transfer times for the frames, and (ii) generate descriptors having the transfer times. The host control module stores the descriptors with the frames in the memory. The MAC module includes gate modules. The gate modules are configured to (i) receive the descriptors with the frames, and (ii) gate the first frames based on the transfer times for the first frames in the descriptors.

The MAC module is configured to access the frames in the memory in response to detecting the transfer of the ownership of the frames from the host control module to the MAC module. The frames include second frames. The first frames have valid transfer times. The second frames have invalid transfer times. The host control module or the MAC module is configured to (i) mask ownership of the first frames, and (ii) not mask ownership of the second frames. The shaping modules include a flow shaping module and a class shaping module for each of the queues. The flow shaping modules are configured to spread data over time on a per-flow basis. The class shaping modules have status information of other class shaping modules of a same class, and are configured to, based on the status information, spread data over time on a per-class basis.

A network device is provided and includes a memory configured to store (i) frames received from a source, and (ii) timestamps corresponding to the frames. A MAC module is configured to (i) receive the frames and the timestamps from the memory, and (ii) forward the frames to a physical layer device. The MAC module includes queues configured to store the frames received from the memory, and shaping modules configured to (i) receive the frames from the queues, and (ii) spread data in the frames over time to generate blocking signals. The MAC module includes gate modules configured to gate first frames of the frames based on the timestamps to delay transfer of the first frames from the queues to the shaping modules. The host control module is configured to transfer ownership of the frames from the host control module to the media access control module.

The media access control module is configured to access the first frames of the frames in the memory in response to the transfer of the ownership of the first frames. The selector module is configured to (i) select one of the blocking signals, and (ii) forward the selected blocking signal to the physical layer device.

The data in the frames includes audio data, video data or time sensitive control data. The host control module determines presentation times for the frames. The presentation times are times when the frames are to be played out at a playout device. The timestamps include the presentation times.

The timestamps include transfer times. The transfer times refer to times when (i) the frames are to be transferred from the memory to the MAC module, (ii) the frames are to be transferred to the queues, or (iii) ownership of the frames are to be transferred from the host control module to the MAC module.

The host control module is configured to (i) determine the transfer times for the frames, and (ii) generate descriptors having the transfer times. The host control module stores the descriptors with the frames in the memory. The gate modules are configured to (i) receive the descriptors with the frames, and (ii) gate the first frames based on the transfer times for the first frames in the descriptors.

The frames include second frames. The first frames have valid transfer times. The second frames have invalid transfer times. The MAC module is configured to (i) mask ownership of the first frames, and (ii) not mask ownership of the second frames. The gate modules include comparators configured to compare the timestamps to a local time to generate comparison signals. Gates are configured to permit transfer of the frames from the queues to the shaping modules based on the comparison signals. Each of the gates is configured to permit transfer of one of the frames in response to the local time matching or being later than a corresponding one of the timestamps.

The shaping modules include a flow shaping module and a class shaping module for each of the queues or for each of the gate modules. The flow shaping modules are configured to spread data over time on a per-flow basis. The class shaping modules have status information of other class shaping modules of a same class, and are configured to, based on the status information, spread data over time on a per-class basis.

The shaping modules include a class shaping module. The class shaping module is configured to receive streams of data in parallel. The streams of data are of a same class. The class shaping module combines and spreads the streams of data over time without status information of other shaping modules.

The shaping modules comprise flow shaping modules. The flow shaping modules are in parallel with each other and are configured to receive a respective one of streams of data. The MAC module is configured to deactivate the flow shaping modules based on the timestamps.

What is claimed is:

1. A network device comprising:
a memory configured to store (i) a plurality of frames received from a source, and (ii) timestamps corresponding to the plurality of frames;
a media access control module configured to (i) receive the plurality of frames and the timestamps from the memory, and (ii) forward the plurality of frames to a physical layer device, wherein the media access control module comprises
queues configured to store the plurality of frames received from the memory,
shaping modules configured to (i) receive the plurality of frames from the queues, and (ii) spread data in the plurality of frames over time to generate blocking signals, wherein the shaping modules include, for each of the queues, a flow shaping module and a class shaping module, wherein the flow shaping modules are configured to spread the data over time on a per-flow basis, and wherein the class shaping modules are configured to, subsequent to the flow shaping modules spreading the data over time on the per-flow basis, spread the data over time on a per-class basis;
a host control module configured to transfer ownership of the plurality of frames from the host control module to the media access control module,
wherein the host control module or the media access control module is configured to mask the transfer of the ownership of first frames of the plurality of frames including gating the first frames based on the timestamps to delay reception of the first frames in the queues; and
a selector module configured to (i) select one of the blocking signals, and (ii) forward the selected blocking signal to the physical layer device.

2. The network device of claim 1, wherein:
the media access control module comprises gate modules; and
the gate modules are configured to (i) receive the plurality of frames from the memory, (ii) mask the transfer of the ownership of the first frames of the plurality of frames including gating the first frames to delay reception of the first frames in the queues, and (iii) forward the plurality of frames to the queues.

3. The network device of claim 1, wherein:
the data in the plurality of frames comprises audio data, video data or time sensitive control data;
the host control module determines presentation times for the plurality of frames;
the presentation times are times when the plurality of frames are to be played out at a playout device; and
the timestamps include the presentation times.

4. The network device of claim 1, wherein:
the timestamps include transfer times; and
the transfer times refer to times when (i) the plurality of frames are to be transferred from the memory to the media access control module, (ii) the plurality of frames are to be transferred to the queues, or (iii) ownership of the plurality of frames are to be transferred from the host control module to the media access control module.

5. The network device of claim 4, wherein:
the host control module is configured to (i) determine the transfer times for the plurality of frames, and (ii) generate descriptors having the transfer times;
the host control module stores the descriptors with the plurality of frames in the memory;
the media access control module comprises gate modules; and
the gate modules are configured to (i) receive the descriptors with the plurality of frames, and (ii) gate the first frames based on the transfer times for the first frames in the descriptors.

6. The network device of claim 1, wherein the media access control module is configured to access the plurality of frames in the memory in response to detecting the transfer of the ownership of the plurality of frames from the host control module to the media access control module.

7. The network device of claim 1, wherein:
the plurality of frames comprise second frames;
the first frames have valid transfer times;
the second frames have invalid transfer times; and
the host control module or the media access control module is configured to (i) mask ownership of the first frames, and (ii) not mask ownership of the second frames.

8. The network device of claim 1, wherein the class shaping modules have status information of other class shaping modules of a same class, and are configured to, based on the status information, spread the data over time on the per-class basis.

9. A network device comprising:
a memory configured to store (i) a plurality of frames received from a source, and (ii) timestamps corresponding to the plurality of frames;
a media access control module configured to (i) receive the plurality of frames and the timestamps from the memory, and (ii) forward the plurality of frames to a physical layer device, wherein the media access control module comprises
queues configured to store the plurality of frames received from the memory,
shaping modules configured to (i) receive the plurality of frames from the queues, and (ii) spread data in the plurality of frames over time to generate blocking signals, and
gate modules configured to gate first frames of the plurality of frames based on the timestamps to delay transfer of the first frames from the queues to the shaping modules,
wherein the shaping modules, for each of the queues or for each of the gate modules, include a flow shaping module and a class shaping module, wherein the flow shaping modules are configured to spread the data over time on a per-flow basis, and wherein the class shaping modules are configured to, subsequent to the flow shaping modules spreading the data over time on the per-flow basis, spread the data over time on a per-class basis;
a host control module configured to transfer ownership of the plurality of frames from the host control module to the media access control module,
wherein the media access control module is configured to access the first frames of the plurality of frames in the memory in response to the transfer of the ownership of the first frames; and
a selector module configured to (i) select one of the blocking signals, and (ii) forward the selected blocking signal to the physical layer device.

10. The network device of claim 9, wherein:
the data in the plurality of frames comprises audio data, video data or time sensitive control data;
the host control module determines presentation times for the plurality of frames;
the presentation times are times when the plurality of frames are to be played out at a playout device; and
the timestamps include the presentation times.

11. The network device of claim 9, wherein:
the timestamps include transfer times; and
the transfer times refer to times when (i) the plurality of frames are to be transferred from the memory to the media access control module, (ii) the plurality of frames are to be transferred to the queues, or (iii) ownership of the plurality of frames are to be transferred from the host control module to the media access control module.

12. The network device of claim 11, wherein:
the host control module is configured to (i) determine the transfer times for the plurality of frames, and (ii) generate descriptors having the transfer times;
the host control module stores the descriptors with the plurality of frames in the memory; and
the gate modules are configured to (i) receive the descriptors with the plurality of frames, and (ii) gate the first frames based on the transfer times for the first frames in the descriptors.

13. The network device of claim 9, wherein:
the plurality of frames comprise second frames;
the first frames have valid transfer times;
the second frames have invalid transfer times; and
the media access control module is configured to (i) mask ownership of the first frames, and (ii) not mask ownership of the second frames.

14. The network device of claim 9, wherein the gate modules comprise:
comparators configured to compare the timestamps to a local time to generate comparison signals; and
gates configured to permit transfer of the plurality of frames from the queues to the shaping modules based on the comparison signals.

15. The network device of claim 14, wherein each of the gates is configured to permit transfer of one of the plurality of frames in response to the local time matching or being later than a corresponding one of the timestamps.

16. The network device of claim 9, wherein the class shaping modules have status information of other class shaping modules of a same class, and are configured to, based on the status information, spread the data over time on a per-class basis.

17. The network device of claim 9, wherein:
one of the class shaping modules is configured to receive a plurality of streams of data in parallel;
the plurality of streams of data are of a same class; and
the one of the class shaping modules combines and spreads the plurality of streams of data over time without status information of other shaping modules.

18. The network device of claim 9, wherein:
the flow shaping modules are in parallel with each other and are configured to receive a respective one of a plurality of streams of data; and
the media access control module is configured to deactivate the flow shaping modules based on the timestamps.

* * * * *